United States Patent [19]
Yoshie et al.

[11] Patent Number: 6,088,883
[45] Date of Patent: Jul. 18, 2000

[54] CLIP CONNECTED UNIT

[75] Inventors: Toru Yoshie; Toshiya Ishida; Takuya Satou, all of Tokyo, Japan

[73] Assignee: Max Co., Ltd., Tokyo, Japan

[21] Appl. No.: 08/980,411

[22] Filed: Nov. 28, 1997

[30] Foreign Application Priority Data

| Nov. 27, 1996 | [JP] | Japan | 8-315982 |
| Dec. 20, 1996 | [JP] | Japan | 8-341296 |
| Mar. 12, 1997 | [JP] | Japan | 9-057523 |

[51] Int. Cl.[7] ................................. B42F 1/00
[52] U.S. Cl. ........................... 24/67 R; 24/67 AR
[58] Field of Search ................ 24/67 R, 67 AR

[56] References Cited

U.S. PATENT DOCUMENTS

| 1,250,016 | 12/1917 | Richards | 24/67 R |
| 2,137,913 | 11/1938 | Kind | 24/67 R |
| 2,510,263 | 6/1950 | Stein | 24/67 AR |
| 2,521,296 | 9/1950 | Kinney | 24/67 R |
| 2,764,501 | 9/1956 | Perri | 24/67 R |
| 2,846,134 | 8/1958 | Moubayed | 24/67 AR |
| 3,125,460 | 3/1964 | Rose | 24/67 AR |
| 3,443,288 | 5/1969 | Batchelder et al. | 24/67 AR |
| 4,978,045 | 12/1990 | Murakami et al. | 227/1 |

FOREIGN PATENT DOCUMENTS

| 0 385 227 | 9/1990 | European Pat. Off. . |
| 1 527 581 | 11/1968 | France . |
| 3-129479 | 12/1991 | Japan . |
| 3-129480 | 12/1991 | Japan . |
| 3-129481 | 12/1991 | Japan . |
| 3-129482 | 12/1991 | Japan . |
| 2 145 033 | 3/1985 | United Kingdom . |
| 2 159 789 | 12/1985 | United Kingdom . |

*Primary Examiner*—Victor N. Sakran
*Attorney, Agent, or Firm*—Jacobson, Price, Holman & Stern, PLLC

[57] ABSTRACT

This invention relates to a clip with which sheets can be fastened without being pricked. A plurality of long-and-narrow rectangular plate-like clips to be used in a clipping apparatus are arranged to be spaced away from the neighboring clips in parallel. The plurality of plate-like clips are connected by connecting members, and the connected unit of the clips is wound into a roll so that the connecting members are positioned outside the roll.

20 Claims, 18 Drawing Sheets

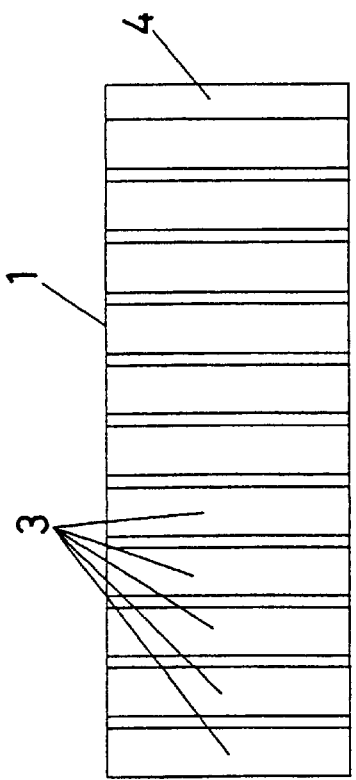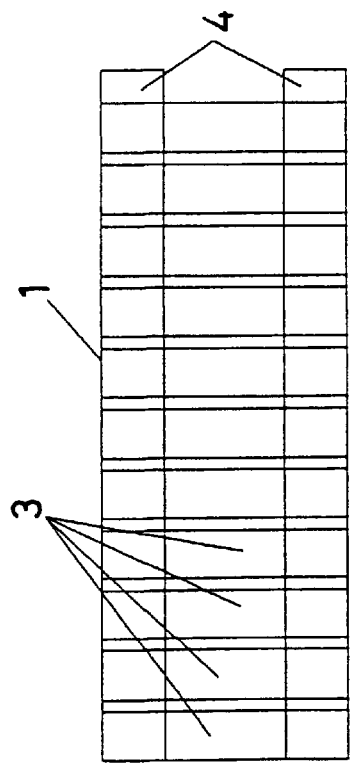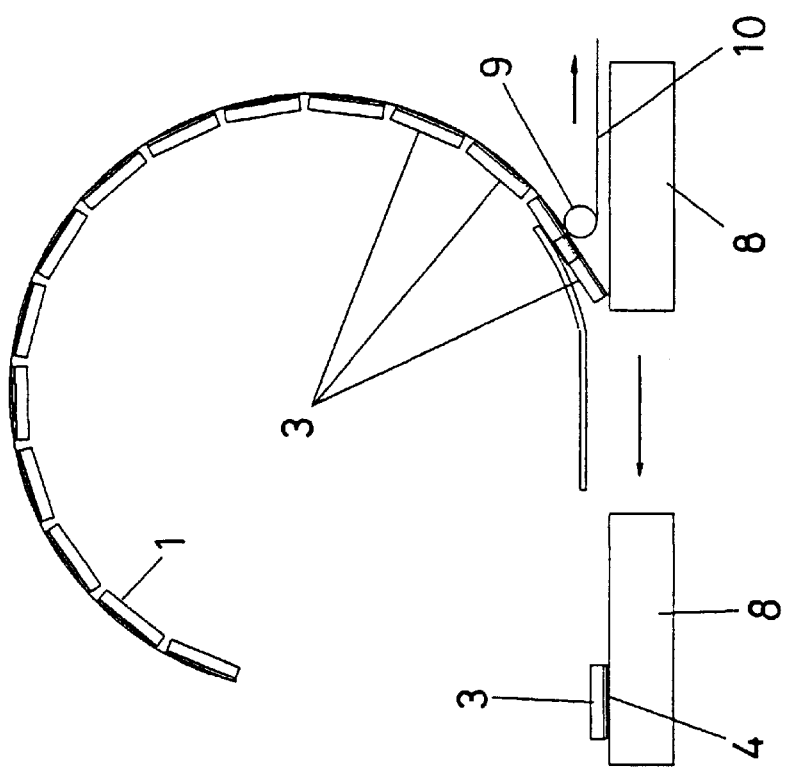

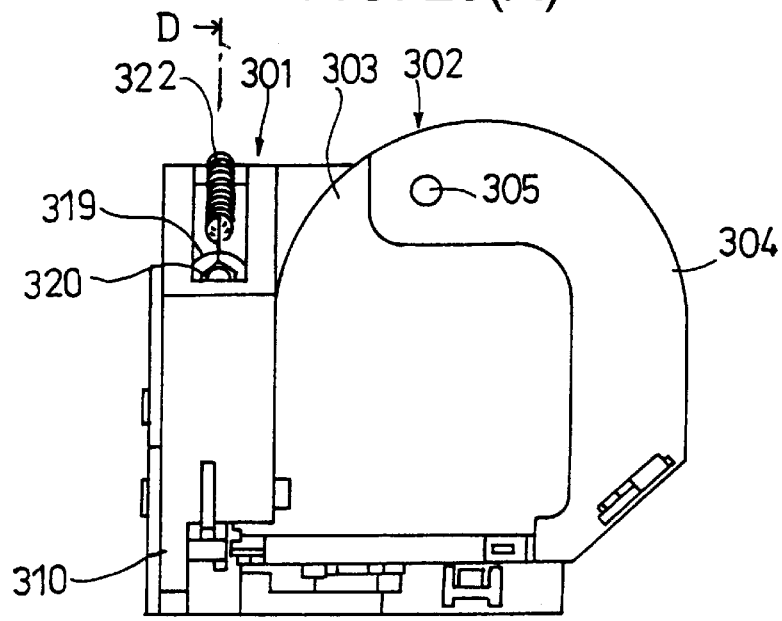
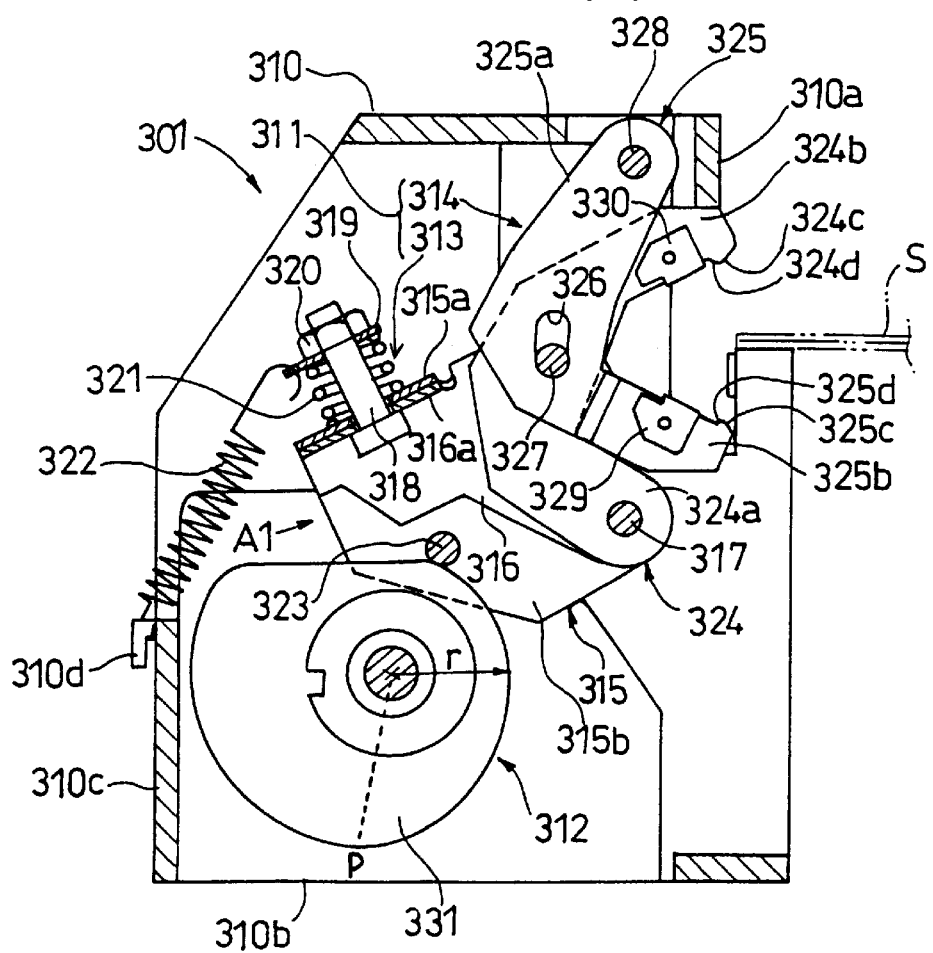

FIG. 31(A)
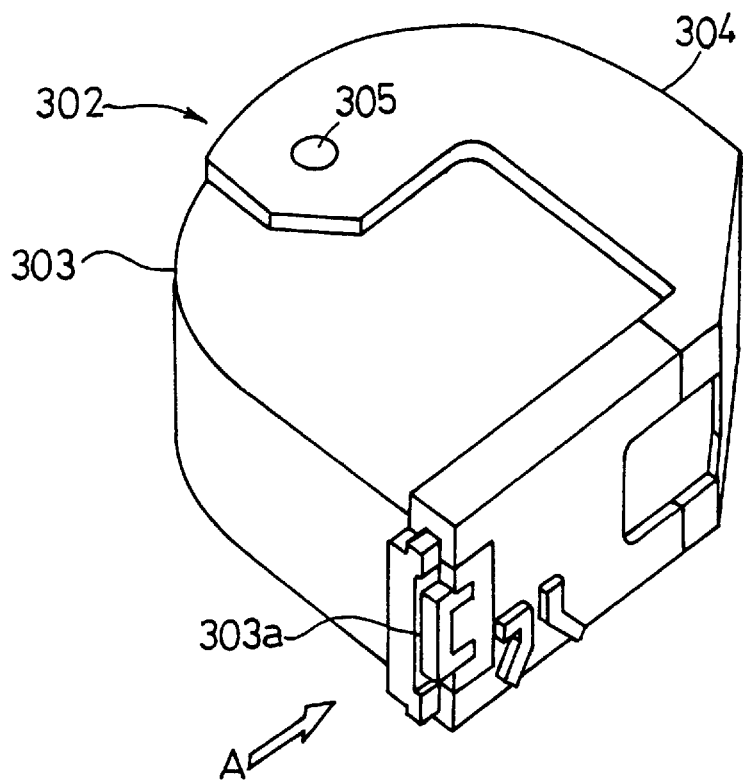
FIG. 31(C)
FIG. 31(B)
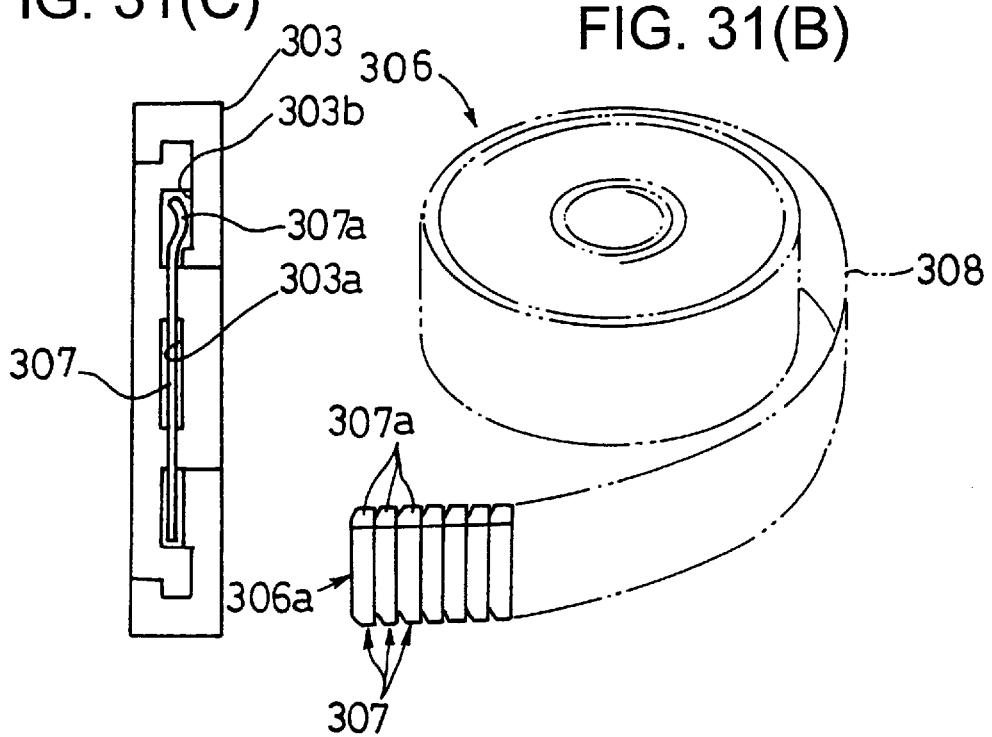

CLIP CONNECTED UNIT

BACKGROUND OF THE INVENTION

1. Field of the Invention

This invention relates to a connected unit of clips for use in an apparatus for fastening piled sheets automatically and, more specifically, to a connected unit of clips which is capable of facilitating the fastening enlarging the number of clips contained inside the apparatus, facilitating the separation of clips, and heightening the force for clipping the sheets.

2. Description of the Prior Art

Conventionally, various types of clips used to fasten a sheaf of sheets are known to Japanese Utility Model Application Early Laid-Open Publications No. Hei 2-38331, No. Hei 2-38332, No. Hei 2-38333, and No. Hei 2-38334.

Japanese Utility Model Application Early Laid-Open Publication No. Hei 3-129479 was applied as Japanese Utility Model Application No. Hei 2-38331 in Apr. 10, 1990 and was laid open in Dec. 26, 1991. In "a clip" according to this application, "an elastic plate is bent, two tongue-like portions divided by the bent portion as the boundary therebetween face each other, one side of one of the tongue-like portions is positioned at an angle of substantially 45° from the boundary line of the bent portion, and the one side is in contact with the other tongue-like portion".

Japanese Utility Model Application Early Laid-Open Publication No. Hei 3-129480 was applied as Japanese Utility Model Application No. Hei 2-38332 in Apr. 10, 1990 and was laid open in Dec. 26, 1991. In "a clip" according to this application, "an elastic plate is bent, two tongue-like portions divided by the bent portion as the boundary therebetween face each other, and only one side of one of the tongue-like portions is in contact with the inner surface of the other tongue-like portion".

Further, Japanese Utility Model Application Early Laid-Open Publication No. Hei 3-129481 was applied as Japanese Utility Model Application No. Hei 2-38333 in Apr. 10, 1990 and was laid open in Dec. 26, 1991. In "a clip" according to this application, "an elastic plate is bent, two tongue-like portions divided by the bent portion as the boundary therebetween face each other, a part of one of the tongue-like portions extends toward the other tongue-like portion and toward the bent portion, and the free end of the one tongue-like portion is in contact with the inner surface of the other tongue-like portion".

Further, Japanese Utility Model Application Early Laid-Open Publication No. Hei 3-129482 was applied as Japanese Utility Model Application No. Hei 2-38334 in Apr. 10, 1990 and was laid open in Dec. 26, 1991. In "a clip" according to this application, "an elastic plate is bent, two tongue-like portions divided by the bent portion as the boundary therebetween face each other, two projecting portions extend from one toward the other of the tongue-like portions, and the free ends of the projecting portions are in contact with two parts of the inner surface of the other tongue-like portion".

In a case where the aforementioned types of clips are used, when a sheaf of sheets is fastened, at first, the ends of a clip are opened with fingers, and next, the sheaf of sheets is inserted between a pair of tongue-like portions.

However, the clip is folded in advance to form two tongue-like portions, the clip is then opened with fingers and the sheaf of sheets is inserted therebetween, and each clip is separated from each other, and thereby a continuous and automatic operation is difficult to perform, so that the clip cannot be used in an automation copying machine or facsimile machine.

On the other hand, long and straight staples are used in a motor-operated stapler installed near a stack tray in a copying machine. Each staple is needle-shaped with a circular section, and a plurality of staples arranged in parallel are connected by means of plastic films. The connected staples are wound into a roll.

For example, Japanese Patent Application Early Laid-Open Publication No. Hei 9-136271 which was applied and laid open in May 16, 1997 relates to "a stapler and a staple cartridge", wherein there is shown figures of the removable cartridge containing a staple belt-like member in which a plurality of straight staples are connected in a belt shape and which.

However, in this motor-operated stapler, a staple is run through a sheaf of sheets and then is bent, and thus holes are pricked in the sheaf of sheets. In order to avoid pricking holes, a sheaf of sheets is required to be held with the clip, however, the aforementioned automatic clipping apparatus has not been developed.

Therefore, the applicant of this invention provides an apparatus, in a case where a plurality of copies are taken in a copying machine or where facsimiles are sent to a plurality of addresses in a facsimile machine, which is capable of preventing the copies or the facsimiles from being mixed. This clipping apparatus can be installed in a copying machine or a facsimile machine can fasten a sheaf of sheets which have been copied or facsimiled. This clipping apparatus is provided with clips between which a sheaf of sheets is held and fastened. In addition to the development of a clipping apparatus, the applicant also considers making the space of containing clips larger, making the separation of clips easier, making the force of holding sheets after bending larger, making the insertion of a sheaf of sheets after bending easier, and the like.

SUMMARY OF THE INVENTION

This invention relates to a clip with which sheets are fastened without being pricked. It is an object to provide the clip which is capable of being used in a clipping apparatus automatically fastening a sheaf of sheets, being handled easily, being set in many numbers inside the apparatus, being compact, being separated easily, keeping the force of fastening sheets during a long period of time, and being reused easily. In order to achieve the object, according to clips used in a clipping apparatus, a plurality of long-rectangular plate-like clips are arranged at spaces in parallel, the plurality of plate-like clips are connected with connecting members, and the connected unit of the clips is wound in a roll so that the connecting members are positioned outside the roll. In this way, the clip-connected unit is constructed, and thereby its handling and the separation of one clip from the clips become easier. Further, since the connecting members are positioned outside the roll, a clip can be bent to hold a sheaf of sheets in a state where the sheet sheaf is positioned outside the roll, and the connecting members come into contact with the sheet sheaf when the sheet sheaf has been held. As a result, the clip can be prevented from coming off the sheet sheaf.

BRIEF DESCRIPTION OF THE DRAWINGS

FIG. 5 is a plan view of clips according to the first embodiment, showing an example where the whole surface of the clips is covered with the plastic film.

FIG. 6 is a plan view of the clips according to the first embodiment, showing an example where both end portions of the clips are covered with the plastic film.

FIG. 7 is a front view of the clips according to the first embodiment, showing that a slightly-adhesive layer is formed on the clips, a silicon-coated paper is adhered on the slightly-adhesive layer, and clips are exfoliated from the silicon-coated paper.

FIG. 27(*b*) is a descriptive drawing showing a sheet-holding clip shown in FIG. 27(*a*).

FIG. 28(*b*) is a descriptive drawing showing the function of the clamp member of the sheet-clipping apparatus.

FIG. 29(*a*) is a plan view of the sheet-clipping apparatus including the clamp member shown in FIG. 28(*a*) and FIG. 28(*b*).

FIG. 29(*b*) is a sectional view of the sheet-clipping apparatus, taken along line D—D in FIG. 29(*a*).

FIG. 31(*a*) is a perspective view of a cartridge shown in FIG. 29(*a*).

FIG. 31(*b*) is a descriptive drawing showing tape with which the clamping plates are arranged in a row, which is set inside the cartridge.

FIG. 31(*c*) is a plan view of an opening from which the tape is pulled, seen from the direction of arrow C shown in FIG. 31(*a*).

DETAILED DESCRIPTION OF THE PREFERRED EMBODIMENTS

Embodiment 1

Preferred embodiments of a clip-connected body according to the present invention will be hereinafter described with reference to the accompanying drawings.

Figure 1:
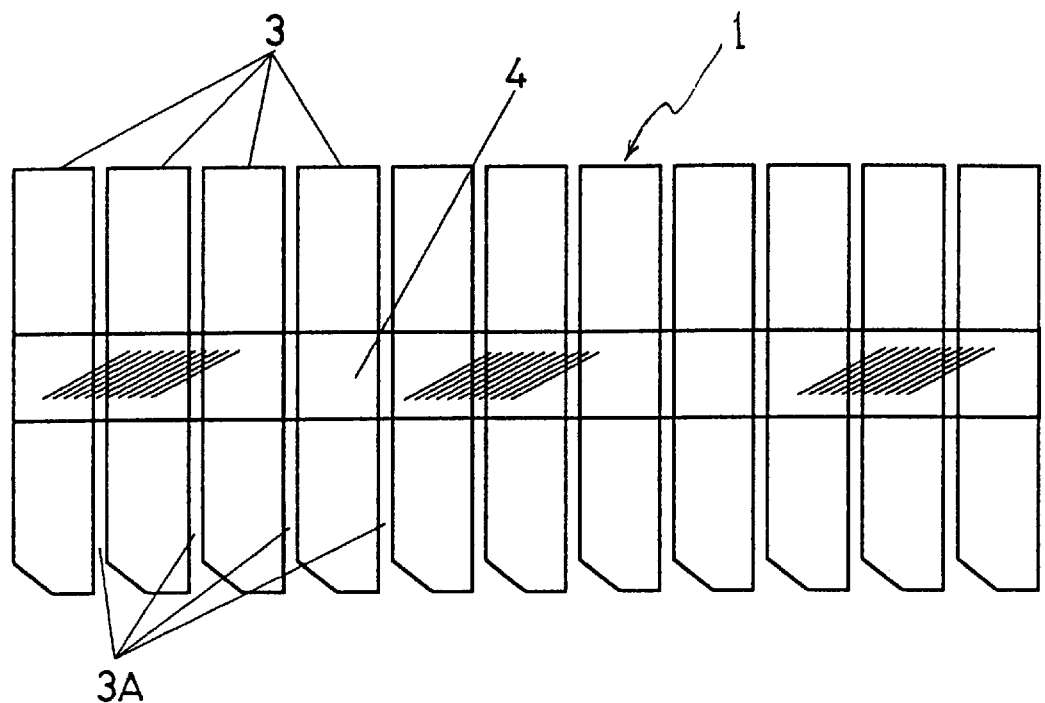
FIG. 1 is a partial plan view of the end portion of a connected unit of clips according to embodiments of the present invention.
Figure 2:
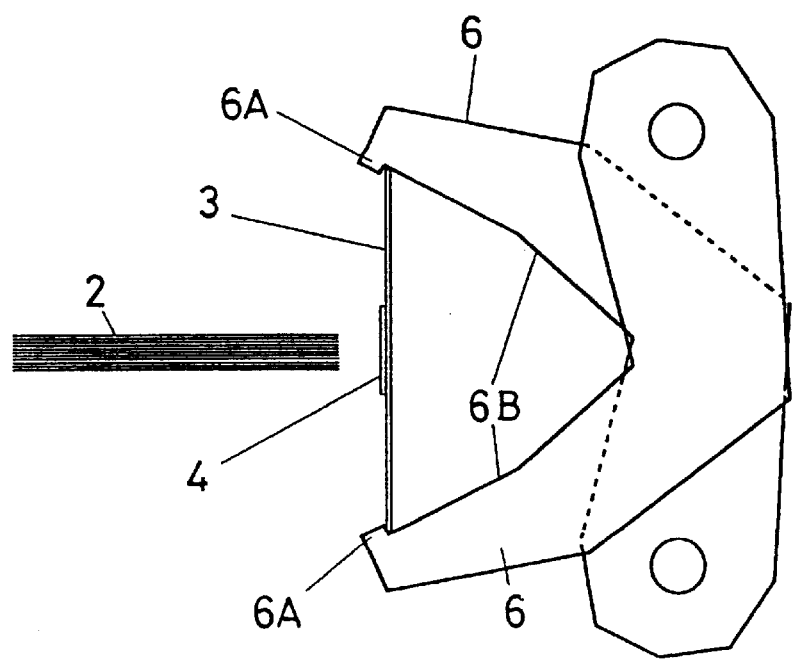
FIG. 2 is a plan view of a clamping apparatus and a clip which has been set between clamps of the clamping apparatus, showing a state of being opposite to sheets.

FIG. 1 shows a connected unit of clips used in a clamping apparatus according to embodiments of the present invention. A clip-connected unit 1 is set between clamps 6, 6 shown in FIG. 2 and is used to clamp sheets 2. A long-rectangular clip 3 which have been separated from the clip-connected unit 1 are connected with a plastic film 4 used as a connecting member. One of the four corners of the clip 3 is notched obliquely, and a hook is inserted into the corner in a position opposite to the notched part, so that the clip 3 bent by clamping can be easily opened. The clip 3 is shaped in a plate made of, for example, a zinc-plated or such iron plate, or a metallic plate such as a stainless steel plate, and its surface may be covered with color or the like. Since the clip 3 is formed press-forming, a surface on which burrs formed in press punching project is opposite to the end of sheets 2.

The plastic film 4 is belt-like and is adhered onto substantially the middle of the clip 3. The plastic film is adhered onto the clip 3 so that it does not come off, then the plastic film 4 is cut off in the direction of its width along the longitudinal direction of the clip 3, and thereby the clip 3 is separated from the clip-connected unit 1. A material which can be easily obtained, such as polyethylene, polyester, or the like, which extends to the direction of the belt-width is used as the plastic film 4, and in a case where a soft and thick material such as low-density polyethylene is used, this material gets to fit the paper of the sheets 2.

A plurality of clips 3 are arranged in the direction of their width at equal spaces 3A, so that they can be easily wound in a roll. In the arranged clips 3 . . . , the plastic film 4 is adhered to form the clip-connected unit 1 on the surface on which the burrs formed in press punching project. Further, the clip-connected unit 1 is wound so that the plastic film 4 is directed outside the roll.

Figure 3:
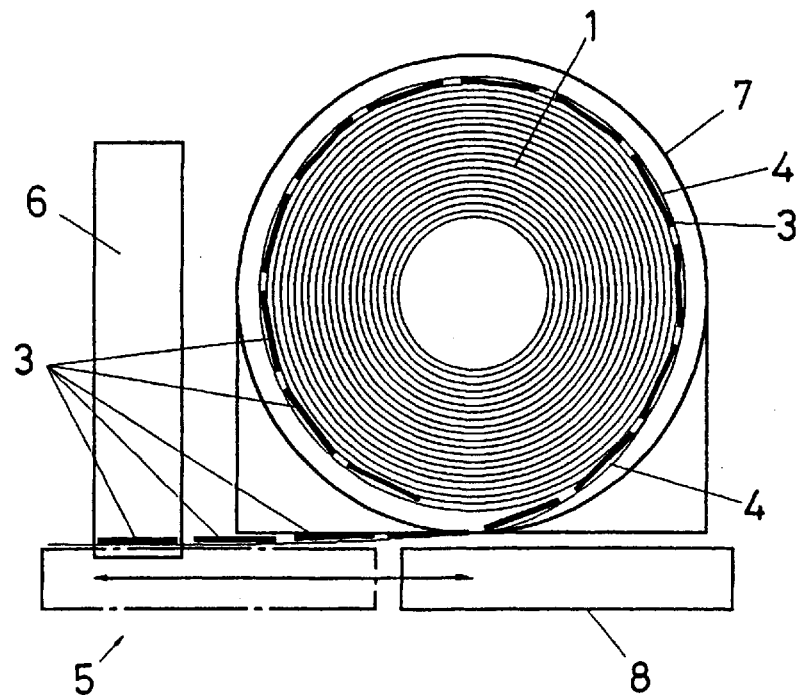
FIG. 3 is a front view of the clamping apparatus and the clip-connected unit according to a first embodiment, showing that a plastic film is wound toward the outside of a roll.
Figure 4:
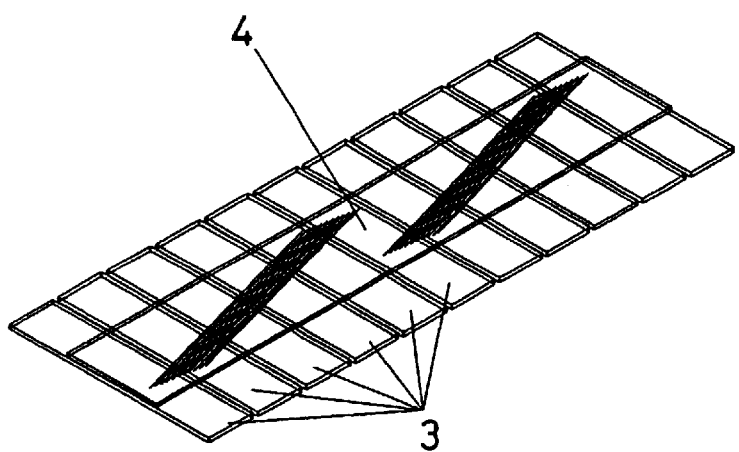
FIG. 4 is a partial perspective view of the end portion of the clip-connected unit.

The clip-connected unit 1 which has been wound in the roll is set inside a cartridge 7 of a clamping apparatus 5 shown in FIG. 3. The clamping apparatus 5 is disposed near a discharge opening or a tray of an apparatus in which many sheets of paper are piled, such as a copying machine, a facsimile machine, or a printer. Naturally, the clamping apparatus 5 may also be used only by itself without being set in another apparatus. The clamping apparatus 5 comprises a pair of clamps 6, 6, a driving mechanism for opening and closing the clamps 6, 6 a slider for supplying the clip 3 from the clip-connected unit 1 to between the clamps 6, 6, a driving mechanism for the slider 8, and a mechanism for the clip-connected unit 1 and the like.

The clip is hooked by the hook of the slider 8 and also between an opening 7A from which the cartridge 7 is pulled and the bases of chin portions 6A, 6A of the ends of the clamps 6, 6. When the clip 3 is hooked between the chin portions 6A, 6A, the clip 3 is supplied so that the burr surface onto which the plastic film 4 of the clip 3 is attached is directed toward the sheets 2. The height by which the chin portions 6A, 6A project from surfaces 6B, 6B opposite to the clamps 6, 6 is designed to be equal to or slightly larger than the thickness of the clip 3, and thus the sheets 2 is held with the clip 3 without being hindered due to the height of the chip portions 6A, 6A.

In the clip-connected unit 1 according to this embodiment, the plastic film 4 used as a connecting member of the clips 3 is directed toward the sheets 2, and when the clip 3 is bent to fasten the sheets 2, the plastic film 4 is not exposed outside the clip 3. Therefore, the outside of the clip 3 with which the sheets 2 have been fastened is in good order.

As shown in FIGS. 5 and 6, in a case where the plastic film 4 covers both ends or the whole part of the sheets 2 as well as holds the sheets 2, the clip 3 can be prevented from coming off the fastened sheets 2, that is, the sheets 2 can be prevented from being separated. Herein, color coating may also be applied in order to make a rustproof treatment or an appearance improvement for clips.

Further, since the plastic film 4 of the clip 3 is wound toward the outside of the roll, when the sheets 2 are applied to the outside of the roll, the plastic film 4 of the clip 3 is applied to the end of the sheets 2. In the clamping apparatus 5 for the clip 3, the positions where the roll of the clip-connected unit 1 is disposed are separated into substantially two positions, that is, a position on the side of the sheets 2 and a position on the side opposite to the sheets 2, as shown in FIG. 3, however, if it is selected that the roll of the clip-connected unit 1 is disposed on the side opposite to the sheets 2, the supply of sheets cannot be hindered. Further, when the plastic film 4 of the clip 3 is wound toward the outside of the roll, the distance of a roundabout route of the clip-connected unit 1 by which the sheets 2 are applied to the clip 3 becomes minimal, so that the space inside which the roll of the clip-connected unit 1 is set can be made as small as possible.

Herein, in a case where the plastic film 4 has slight adhesion of being easily exfoliated after adhered to a body to be held, the sheets 2 are prevented from coming off the clip 3. Further, instead of the plastic film 4, a film, a resin-coated film, a sheet of paper, or a cloth, may also be used as the connecting member.

Further, the clip-connected unit 1 may also be constructed, as shown in FIG. 7, so that the slightly-adhesive plastic 4 is applied onto the side of the burr-projecting surface of the clip 3, and for example, the clip 3 is adhered to silicon-coated paper or the like, and silicon-coated paper 10 is wound toward the outside of the roll. Such a clip-connected unit 1 may also be constructed, so that a roller 9 used for exfoliation is disposed near a waiting position of the slider 8, the silicon-coated paper 10 is pulled toward the direction of an arrow in FIG. 7, and the clip 3 is exfoliated from the silicon-coated paper 10 and is forwarded to the slider 8.

Embodiment 2

A second embodiment according to the present invention will be hereinafter described with reference to the accompanying drawings.

Figure 8A:
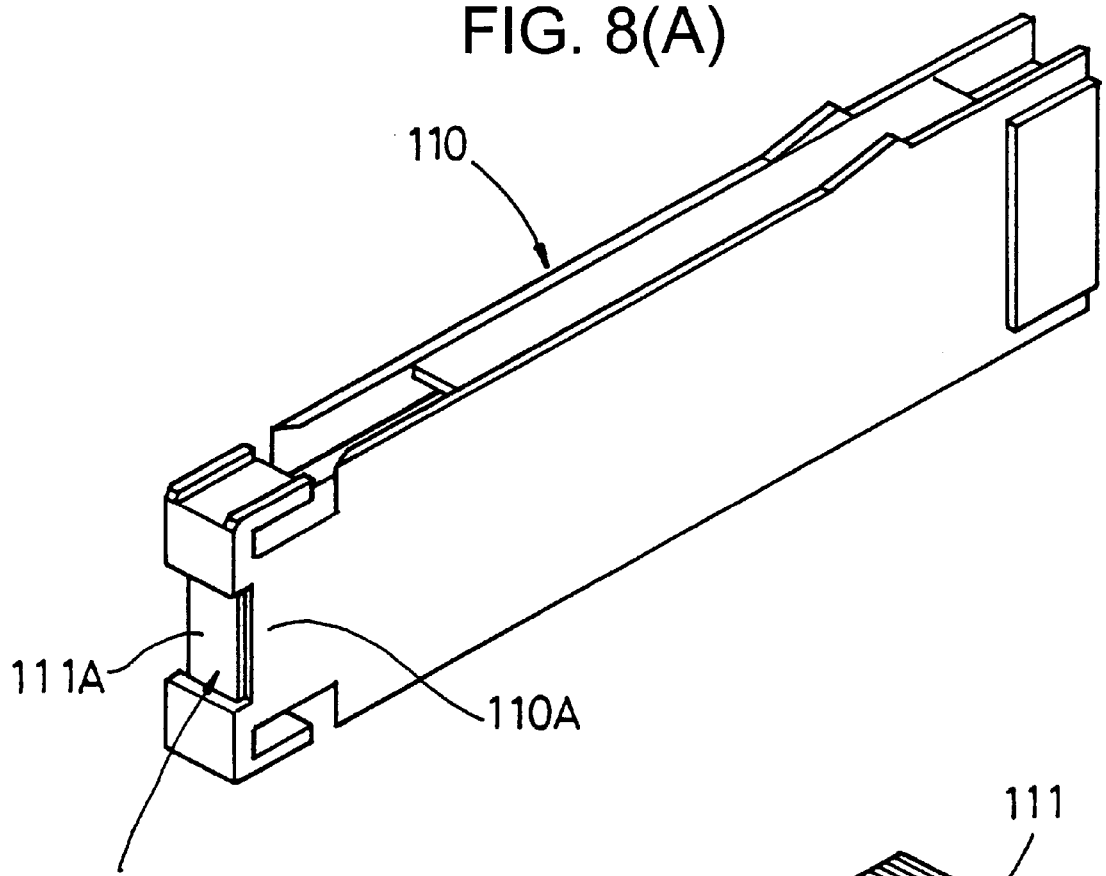
FIG. 8(A) is a perspective view of a containing case which contains clamping plates.
Figure 8B:
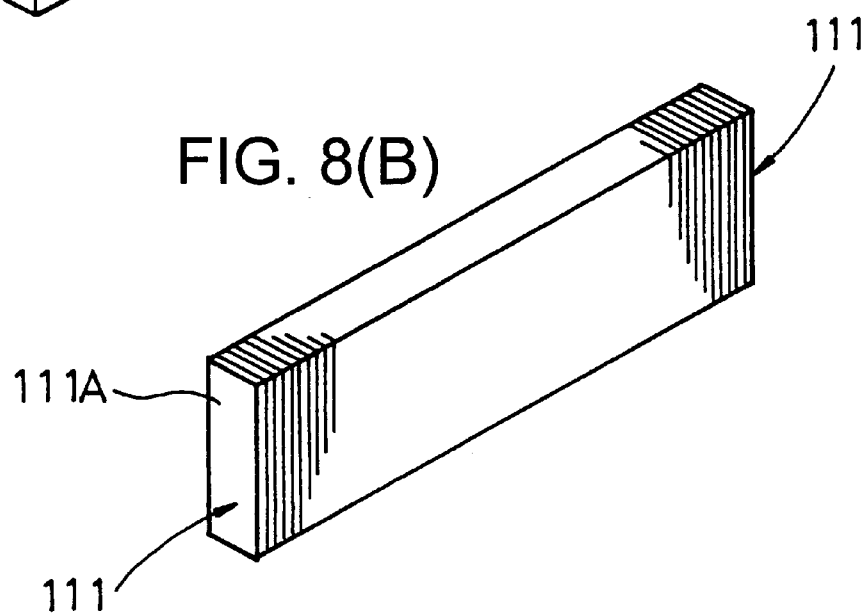
FIG. 8(B) is a perspective view of the clamping plates which has been set inside the containing case.
Figure 9:
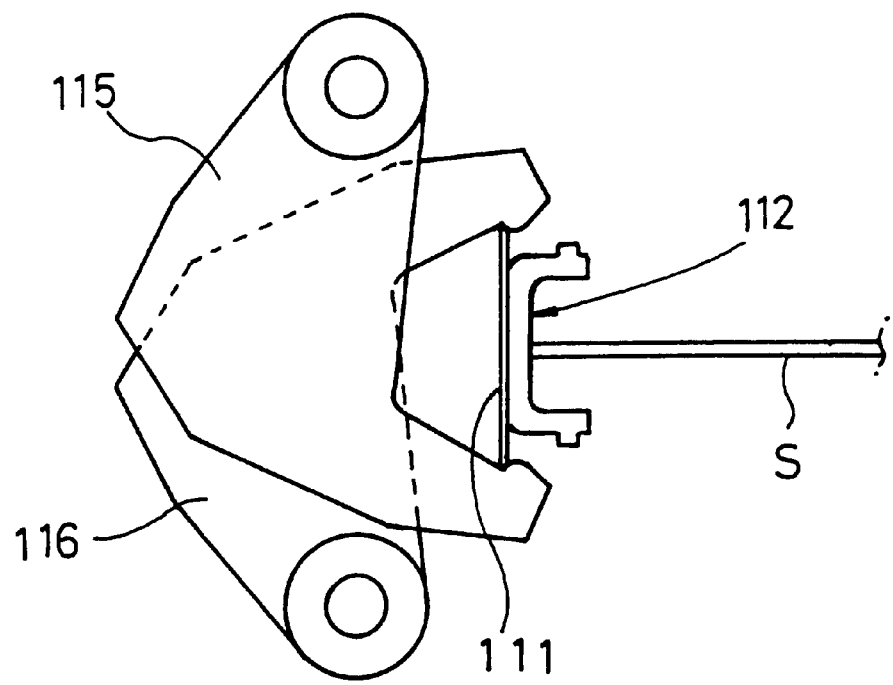
FIG. 9 is a front view of the clamping plates and a clamping member, showing a state where the clamping plates have been sent to the clamping member with a slider.

In FIG. 8(A), reference character 110 designates a containing case which is attached to a clamping apparatus (not shown), and inside the containing case 110, as shown in FIG. 8(B), a plurality of clips 111 are set in piles. Each clip 111 is drawn one by one from an end portion 110A of the containing case 110 with a slider 112 (see FIG. 9) of the clamping apparatus.

Figure 10:
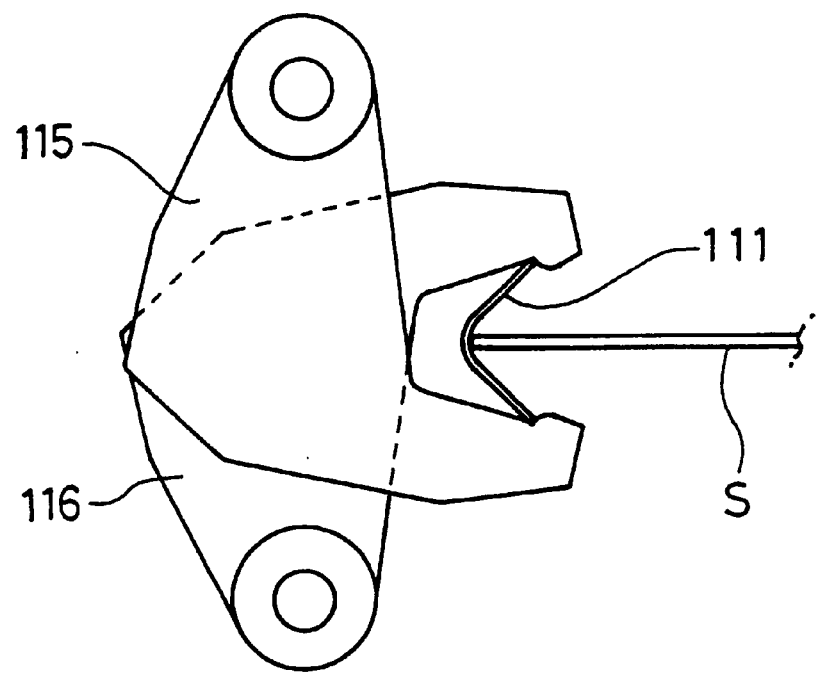
FIG. 10 is a front view of the clamping plates and the clamping member, showing a state where the clamping plates are bent by the clamping member.
Figure 11:
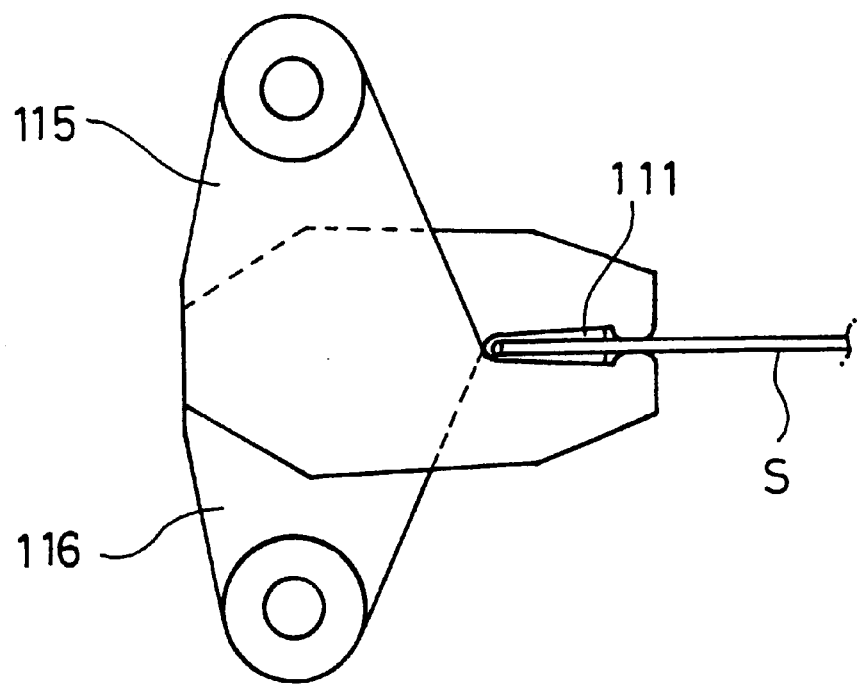
FIG. 11 is a front view of the clamping plates and the clamping member, showing a state where the clamping plates have been bent by the clamping member until the end of a sheaf of sheets has been clamped.
Figure 12:
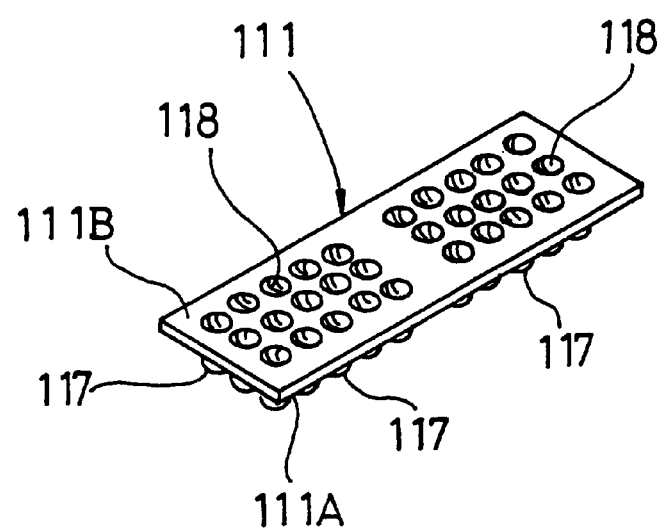
FIG. 12 is a perspective view of the clamping plates.
Figure 13:
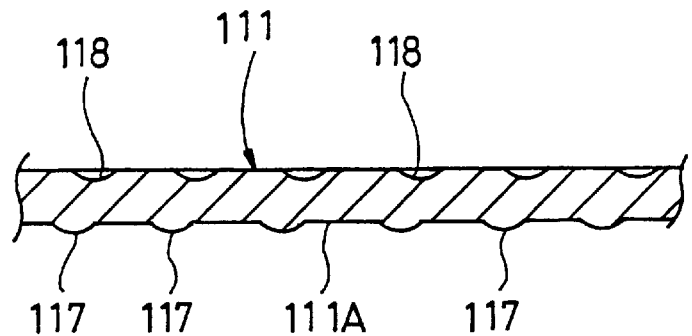
FIG. 13 is a sectional view of the clamping plates.
Figure 14:
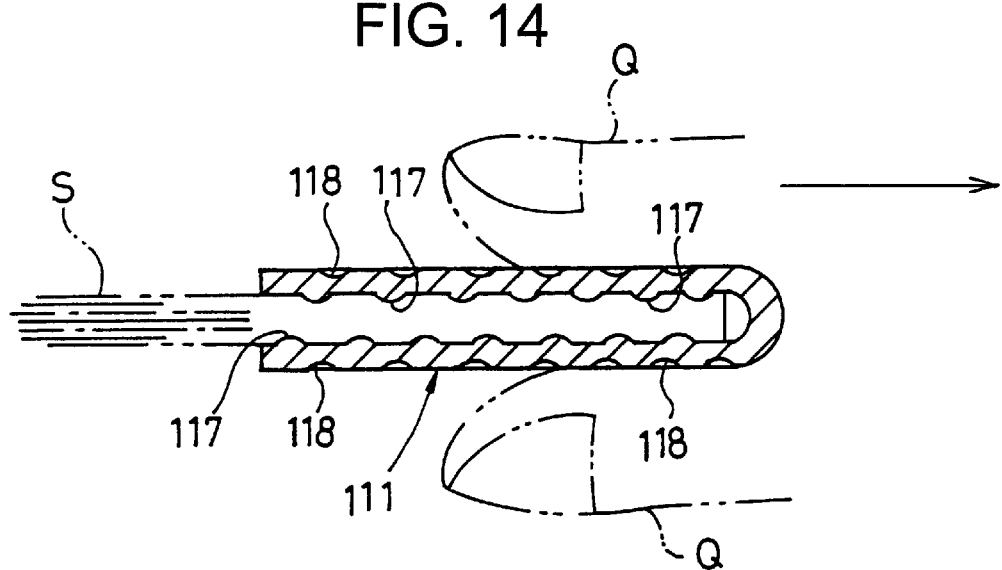
FIG. 14 is a sectional view of the clamping plates, showing a state where the sheet sheaf has been clamped with the clamping plates.

The clip 111 drawn with the slider 112 is, as shown in FIG. 10 or 12, bent with clamping members 115, 116 of the clamping apparatus to hold the end of sheets S. The clip 111 is made of metal and shaped in a plate. As shown in FIG. 13 or 14, a plurality of convex portions 117 are formed in the front surface 111A on the inside of the clip 111, and a plurality of concave portions 118 are formed in the back surface 111B of the clip 111. The convex portions 117 or the concave portions 118 are formed in a chemical treatment such as a pressing process or an etching process.

Since the frictional resistance between the sheets S and the clip 111 become larger because of the convex portions 117 of the clip 111, the holding force of the clip 111 becomes larger. Therefore, the sheets S can be prevented from coming off the bent clip 111, and the thickness of the clip 111 can be made smaller because the holding force becomes larger.

In order to release the clip 111 from the sheets S, as shown in FIG. 14, the clip 111 is picked and pulled in the direction of an arrow with operator's fingers Q. Since the plurality of concave portions 118 are formed in the back surface 111B of the clip 111, the fingers Q are hooked by the concave portions 118, so that the clip 111 can be easily released.

According to the second embodiment, in a pressing process or a chemical treatment, the convex portions 117 or the concave portions 118 are formed so as to increase the frictional resistance, however, tape having larger frictional resistance may also be adhered onto the front surface 111A or both surfaces of the chip 111. Further, a coarse-grain coating agent may also be applied onto the front surface 111A or both surfaces of the chip 111 to obtain larger frictional resistance.

Figure 15A:
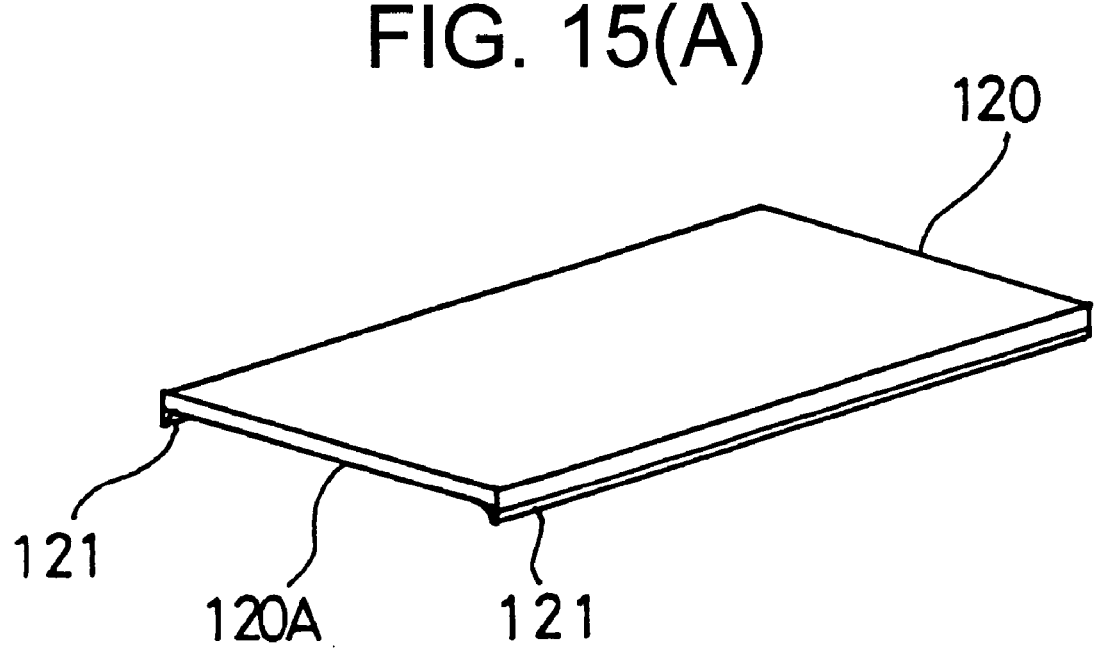
FIG. 15(A) is a perspective view of clamping plates according to another example.
Figure 15B:
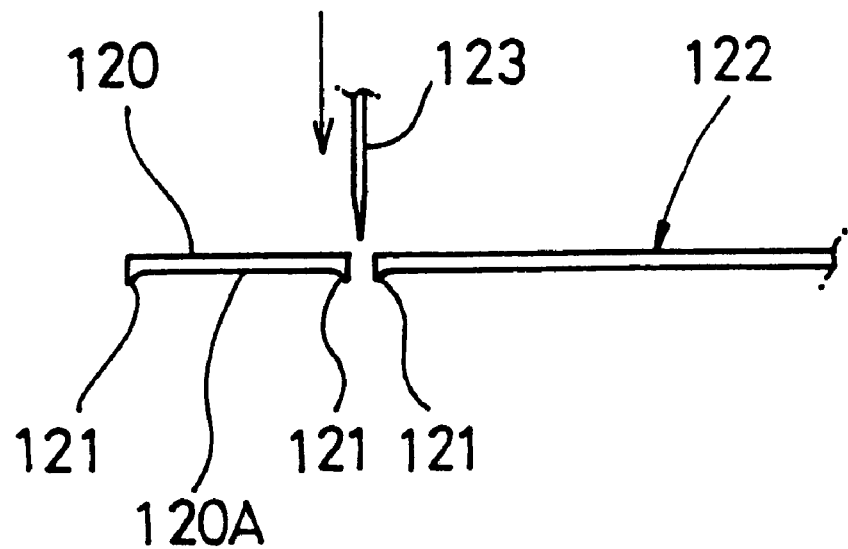
FIG. 15(B) is a schematic illustration showing a manufacturing process of the clamping plates.

Further, as shown in FIG. 15, there may be used a burr 121 which may be formed when a plate 122 is cut off into clip 120 with a cutter 123. In this case, the sheets S are held with a surface 120A on which the burr 121 is formed.

Embodiment 3

Figure 16:
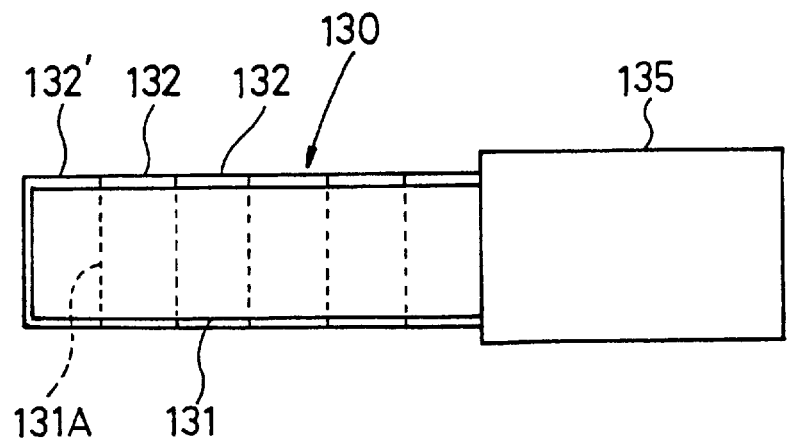
FIG. 16 is a front view of a clamping body.
Figure 17:
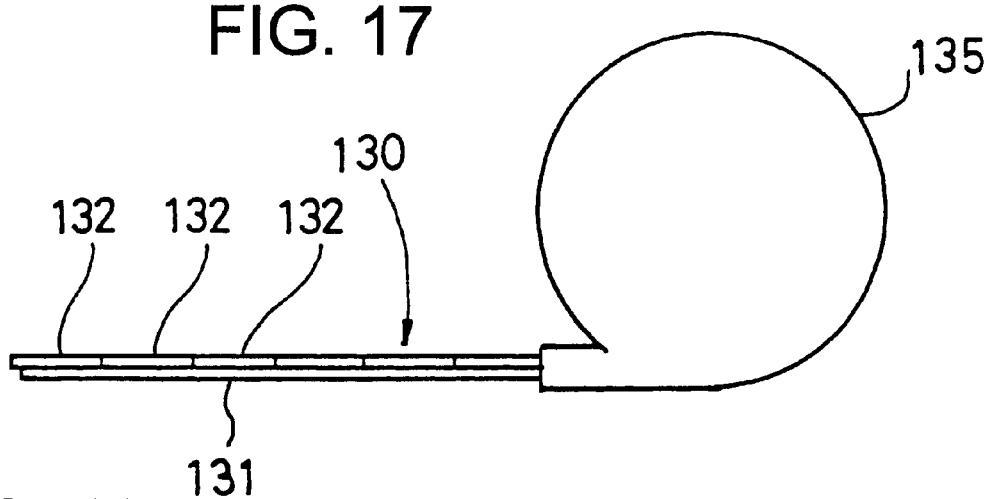
FIG. 17 is a plan view of the clamping body shown in FIG. 16.

In FIGS. 16 and 17, reference character 130 designates a clip-connected body. In the clip-connected body 130, a plurality of clips 132 are adhered to belt-like tape 131. The clips 132 are connected in a belt-like shape with the tape 131. The clip-connected body 130 is wound in a roll inside a case 135.

The tape 131 having larger frictional resistance is used and also has molecular orientation in the longitudinal direction of the clips 132. When a clip 132' is bent by the clamping members 115, 116, because of this molecular orientation, the tape 131 is cut off along a broken line 131A, so that the tape 131 can be prevented from being cut off in a state of being positioned out of the clip 132'.

According to a third embodiment, the sheets S are held on the side of the tape 131, and only one chip 132 is sent into the clamping members 115, 116 by a slider (not shown) so that the clip 132 is bent by the clamping members 115, 116.

Herein, tape with slightly-adhesive both surfaces may also be used as the tape 131.

Figure 18:
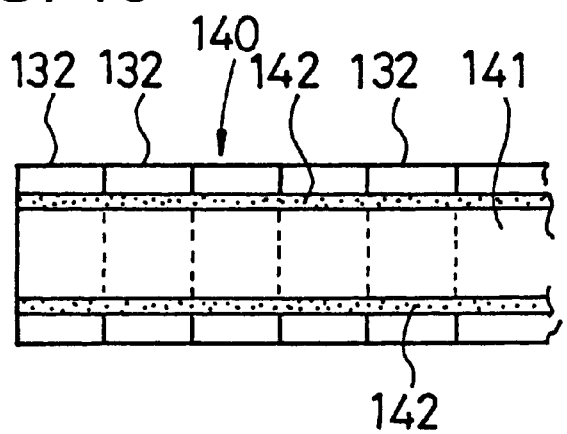
FIG. 18 is a partial front view of another clamping body.

FIG. 18 shows another clip-connected body 140, wherein tape 141 is disposed in the middle of the clip 132, the tape 141 is adhered to the clip 132 with an adhesive agent 142 such as hot melt, and the adhesive agent 142 is positioned out of the tape 141. The positioned-out adhesive agent 142 makes the frictional resistance for holding the sheets S larger.

Figure 19:
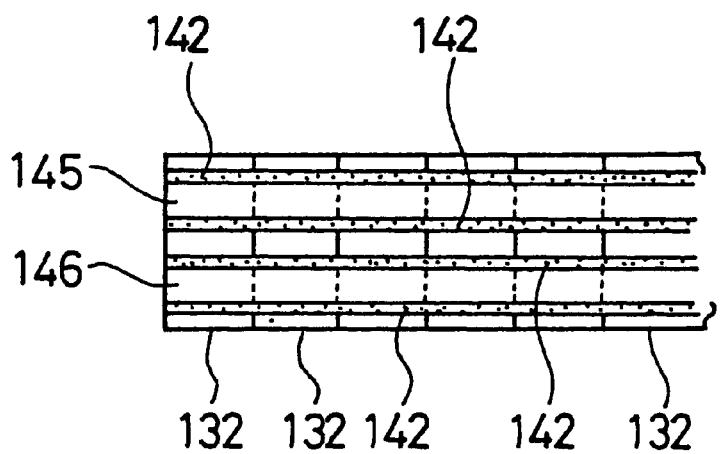
FIG. 19 is a partial front view of another clamping body.

In FIG. 19, pieces of tape 145, 146 are disposed on both sides of the clip 132. However, except this respect, the construction in FIG. 19 is the same as that in FIG. 18.

According to the second and third embodiments, the clip 120 holding the sheets S can be prevented from coming off the sheets S, and the larger frictional resistance between the clip 120 and the sheets S makes the holding force of the clip 120 larger. Therefore, the thickness of the clip 120 is made smaller and the clip 120 is easily bent, so that the driving force of clamps can be made smaller.

Embodiment 4

A clip according to a preferred embodiment of the present invention will be hereinafter described with reference to FIGS. 20 to 27.

FIGS. 20(A) to 20(D) are plan views of a clip according to a fourth embodiment of the present invention. Such a clip is bent by clamps of a clamping apparatus shown in FIG. 23 to hold a sheaf of sheets S. A clipping apparatus is installed in a tray such as a tray or a sorter on which the paper sheets which have been copied in a copying machine or a facsimile machine are piled. The clipping apparatus comprises a cartridge for containing many clips, clamps 204, 204 for holding both upper and lower ends of a clip, and a means for supplying a clip 201 from the cartridge to the clamps 204, 204.

The free ends of the clip 201 have an asymmetric configuration with respect to the middle line along which the clip 201 is bent, and in a case where the clip 201 is bent by the clamps 204, 204, the edge portions are not trued up into a shape of exposing the inner surface of each free end.

Figures 20A, 20B, 20C, 20D:
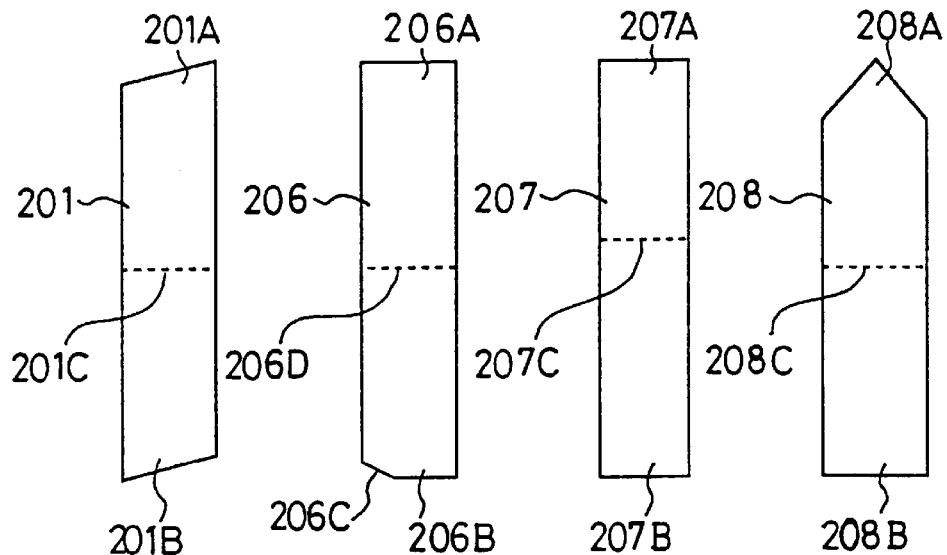
FIG. 20(A) is a plan view of a clip according to the first embodiment of the present invention.
FIG. 20(B) is a plan view of a first variation of the clip according to the first embodiment.
FIG. 20(C) is a plan view of a second variation of the clip according to the first embodiment.
FIG. 20(D) is a plan view of a third variation of the clip according to the first embodiment.

In other words, the free ends 201A, 201B at both ends of the clip 201 shown in FIG. 20(A) projects at an acute angle, and when the clip 201 is bent along the bent middle line 201C, the inner surfaces 202A, 202B of the free ends 201A, 201B are exposed. The clip 201 is formed, for example, by being punched into the shape of a long and narrow parallelogram in a steel plate, a stainless plate, or an aluminum plate in a pressing process. The plurality of clips 201 are arranged in parallel at regular intervals in the direction of their width, and the middle parts of the clips 201 are connected with a piece of tape 203.

Figure 22:
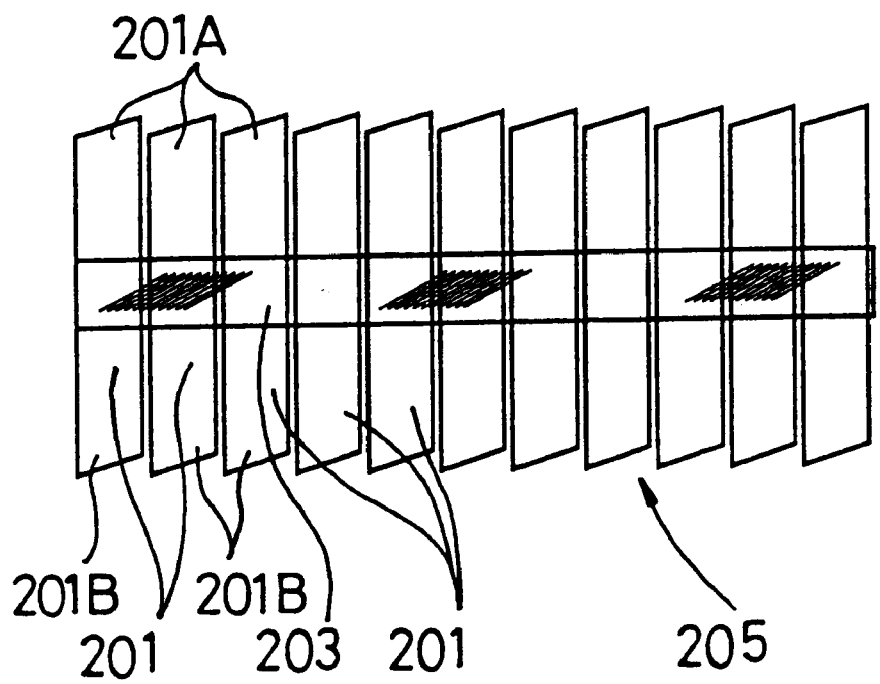
FIG. 22 is a plan view of a part of a clip belt in which the clips shown in FIG. 20(A) are connected with a piece of tape.
Figure 23:
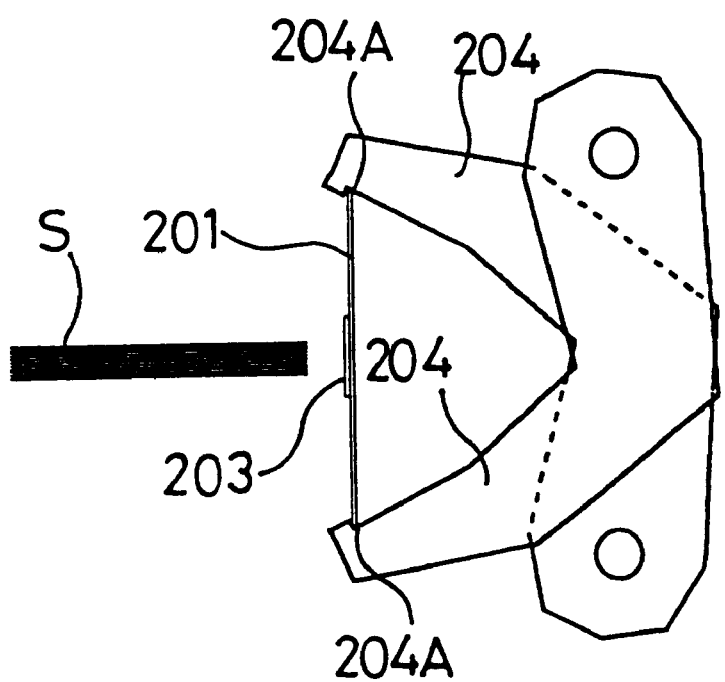
FIG. 23 is a plan view of a clamp for bending the clip according to the present invention to clamp a sheaf of sheets.
Figure 24:
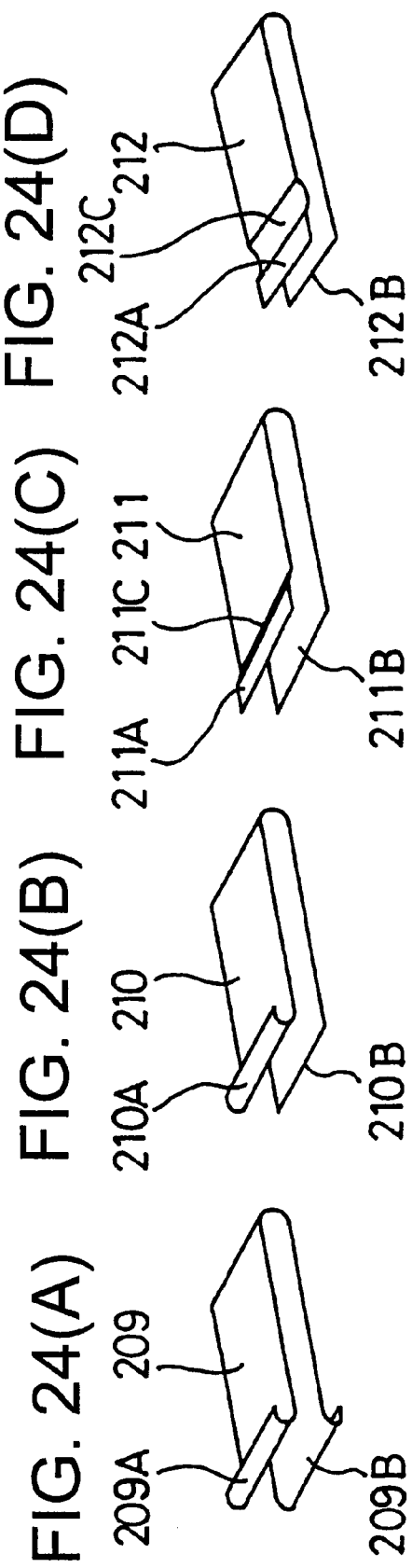
FIG. 24(A) is a perspective view of a clip according to the second embodiment of the present invention, showing a state where the clip has been bent.
FIG. 24(B) is a perspective view of a first variation of the clip according to the second embodiment, showing a state where the clip has been bent.
FIG. 24(C) is a perspective view of a second variation of the clip according to the second embodiment, showing a state where the clip has been bent.
FIG. 24(D) is a perspective view of a third variation of the clip according to the second embodiment, showing a state where the clip has been bent.

As shown in FIG. 22, the tape 203 is made of a film such as polyethylene. The tape 203 extends toward the direction of its width so that the tape 203 can be easily torn. When the clip 201 is hooked by stepped portions 204A, 204A of clamps 204, 204 shown in FIG. 23 and thus the clamps 204, 204 are closed, the tape 203 is torn in the direction of the width of the tape 203 and is separated from a connected body of the clip 201.

Since the free ends 201A, 201B at both ends of the clip 201 are formed so as not to be trued up when bent, the stepped portions 204A, 204A of the clamps 204, 204 may also be shaped so as to hold the projecting portions of the free ends 201A, 201B, so that the clip 201 can be securely held by the clamps 204, 204.

According to the clip 201, in a case where the clip 201 is bent by the clamps 204, 204 and a sheaf of sheets S such as sheets to be copied is held, the free ends 201A, 201B of the clip 201 are bent without being trued up. Therefore, in a case where the clip 201 released from the sheaf of sheets S is attached again onto the sheet sheaf S in a coping operation or the like, the sheaf of sheets S is applied to the inner surfaces of the free ends 201A, 201B and thus the clip is twisted, the free ends 201A, 201B are opened, and the sheaf of sheets S is moved to the inner part of the clip 201. Thereby, the sheaf of sheets S is held between the clip 201 again.

A clip 206 shown in FIG. 20(B) is formed by cutting a corner of a long and narrow rectangular steel plate. Since the cut portion 206C is formed, when the clip 206 is bent along a middle line 206D, free ends 206A, 206B are laid upon each other without being trued up. When the clip 206 is twirled on a fulcrum where the edge of the cut portion 206C is applied to the side of the sheaf of sheets S so that the free end 206A approaches the side of the sheaf of sheets S, the sheaf of sheets S is brought in between the free ends 206A, 206B of the bent clip 206. Hence, if the sheaf of sheets S is moved to the inner part of the clip 206, the sheaf of sheets S is held between the clip 206 again.

A clip 207 shown in FIG. 20(C) is made of a long and narrow rectangular steel plate, and a bent middle line 207C is formed away from the middle line of free ends 207A, 207B. Since the bent middle line 207C is formed away from the middle line, the free ends 207A, 207B are laid upon each other without being trued up when the clip 207 is bent.

In order to bring the bent middle line 207C of the clip 207 to a position closer to one free end 207A, for example, a groove, a hollow, a tempered part, or the like for concentrating bending stress along the bent middle line 207C, is formed, or a guide used when the clip 207 is bent is formed on the side of the clamps 204, 204.

According to the clip 207 shown in FIG. 20(C), when the free end 207A is applied to the side of the sheaf of sheets S so that the free end 207A becomes a fulcrum and the free end 207B is twirled to the side of the sheaf of sheets S, the sheaf of sheets S is brought in between the free ends 207A, 207B. Therefore, when the sheaf of sheets S is moved to the inner part of the clip 207, the sheaf of sheets S is easily held between the clip 207.

Figures 21A, 21B, 21C, 21D:
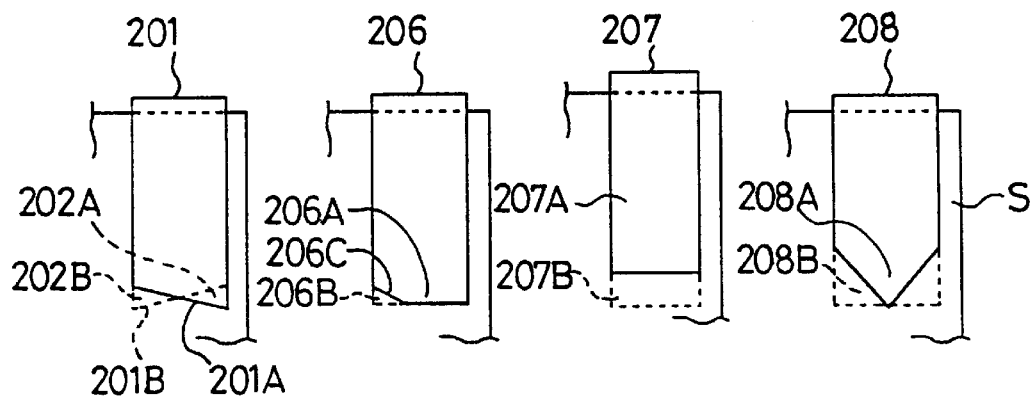
FIG. 21(A) is a plan view of the clip according to the first embodiment of the present invention, showing a state where the clip has been bent.
FIG. 21(B) is a plan view of a first variation of the clip according to the first embodiment, showing a state where the clip has been bent.
FIG. 21(C) is a plan view of a second variation of the clip according to the first embodiment, showing a state where the clip has been bent.
FIG. 21(D) is a plan view of a third variation of the clip according to the first embodiment, showing s state where the clip has been bent.

In the clip 208 shown in FIG. 20(D), one free end 208A has a triangular shape and the other free end 208B has a rectangular shape, and a bent middle line 208C is formed in the longitudinal middle of the clip 208. Thereby, as shown in FIG. 21(D), when the clip 208 is bent, the free ends 208A, 208B are laid open upon each other without being trued up.

In a case where the sheaf of sheets S is held again with the clip 208 which has been released from the sheaf of sheets S and kept bent, when the free end 208B is twirled on a fulcrum where the inclined part of the free end 208B is applied to the side of the sheaf of sheets S, the sheaf of sheets S is brought in between the free ends 208A, 208B. Hence, when the sheaf of sheets S is moved to the inner part of the clip 208, the sheaf of sheets S is held between the clip 208.

Embodiment 5

FIGS. 24(A) to 24(D) show a clip according to a fifth embodiment. In a clip 209 shown in FIG. 24(A), there is formed guiding portions in which free ends 209A, 209B of the clip 209 are curled outside in advance. However, the clip 209, except the curled guiding portions of the free ends 209A, 209B, is shaped in a plate. The clips 209 are connected, for example, with a piece of tape 203 or the like, which is cut off in a closing operation of clamps 204, 204. In the clip 209, since there is formed the guiding portions curled outside of the position where the free ends 209A, 209B fasten the sheaf of sheets S, the clip 209 is twirled on a fulcrum of one free end 209A so that the side of the sheaf of sheets S is applied to the inner side of the other free end 209B. Further, when the sheaf of sheets S is moved to the inner part of the clip 209, the sheaf of sheets S is easily held between the clip 209.

In a clip 210 shown in FIG. 24(B), a guiding portion in which one free end 210A is curled is formed, and the other free end 210B is in a plate-like shape. When the clip 210 is bent by the clamps 204, 204, the clip 210 is opened toward the direction in which the curled part of the one free end 210A is spaced away from the other free end 210B. In press forming or the sequent processing, only the free end 210A of the clip 210 is processed in a circular-arc shape. Herein, a mechanism in which the clip 210 is delivered out to the clamps 204, 204 includes a pressing mechanism for bending the free end 210A. Before the clip 210 is hooked on the clamps 204, 204 by the pressing mechanism, the free end 210A may also be formed in the plate-like clip 210.

In the clip 210, when the sheaf of sheets S is applied to the curled free end 210A so that the sheaf of sheets S becomes a fulcrum and the flat free end 210B is twirled on the side of the sheaf of sheets S, the sheaf of sheets S is inserted in between the clip 210 and then is moved to the inner part thereof, so that the sheaf of sheets S can be held between the clip 210.

In the same way as the clip 210 shown in FIG. 24(B), a clip 211 shown in FIG. 24(C), a taper portion 211C used as a guiding portion of the sheaf of sheets S is formed in advance in a free end 211A, and the whole part except the part mentioned above is formed in a plate. This taper portion 211C may be formed in advance or may also be pressed before hooked on the clamps 204, 204. In the clip 211, when the sheaf of sheets S is moved from between the free ends 211A, 211B to the inner part thereof, the sheaf of sheets S is easily held again between the clip 211.

In a clip 212 shown in FIG. 24(D), there is in advance formed a curled portion 212C which comes into contact with the sheaf of sheets S near a free end 212A, the whole part including the other free end 212B except the part mentioned above is formed in a plate. This curled portion 212C may be formed in advance or may also be pressed before hooked on the clamps 204, 204. In the clip 212, when the sheaf of sheets S is moved from between the free ends 212A, 212B to the inner part thereof, the sheaf of sheets S is easily held again between the clip 212.

Figure 25:
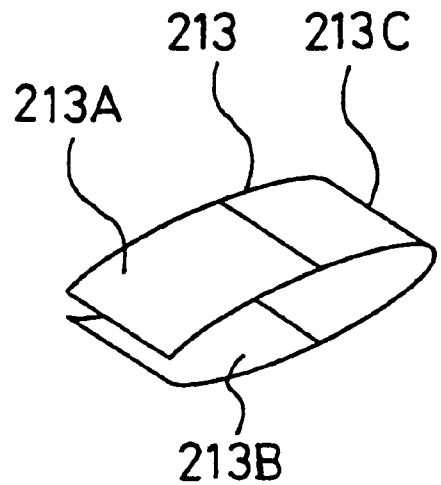
FIG. 25 is a perspective view of a clip according to the third embodiment of the present invention, showing a state where the clip has been bent.

FIG. 25 shows a clip 213 with which a fastening operation can be made according to the thickness of the sheaf of sheets S. The clip 213 is made of a steel plate, and the elastic limit of free ends 213A, 213B is designed to be higher than that of a bent middle portion 213C, for example, in a hardening process. The elastic limit of the bent middle portion 213C is designed to be low in a tempering process or the like.

In a clip 213 shown in FIG. 25, in a case where the sheaf of sheets S is held between the clip 213 by the clamps 204, 204, the elastic limit of the free ends 213A, 213B is heightened and the elastic limit of the middle portion is lowered, and thus the force of holding the sheaf of sheets S is heightened. Thereby, even though the clip 213 is held again after the clip 213 which is kept held had been released from the sheaf of sheets S, the holding force can be prevented from being lowered.

Figure 26:
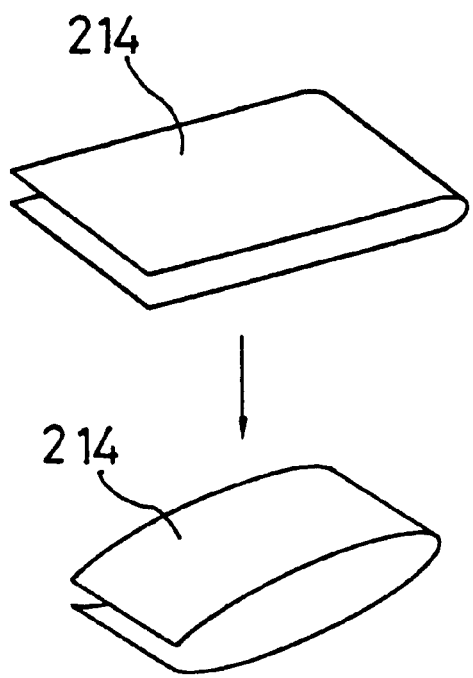
FIG. 26 is a perspective view of a clip according to the fourth embodiment of the present invention, showing a state where the clip has been bent.

FIG. 26 shows a clip 214 made of a steel plate of a configuration-memorizing alloy. When the clip 214 is heated up to a temperature higher than the room temperature, the radius of curvature in a bent portion becomes larger and the bent position is curved, so that the configuration can be memorized. Accordingly, the attachment or removal of the clip 214 can be easily carried out and the distortion which may be caused by the change of configuration can be prevented from occurring, so that the holding force can be retained.

Herein, a notch in a V-shape, a U-shape, or a bracket-shape may also be formed in each of the clips 201 to 214 so that a projecting portion inside of the notch is hooked on the surface of the sheaf of sheets S when each clip is bent. Thereby, each clip can be prevented from being pulled out. Further, a letter, a figure, or the like, is marked, or color coating, plating, embossing, printing, sealing, or the like, may also be processed, or some of these processes may also be mixed, on the upper surface or the under surface of each of the clips 201 to 214. In addition, a soft plastic layer or a soft rubber layer which increases the sliding frictional resistance may also be applied onto the inner surface of the bent portion of each of the clips 201 to 214, so that each of the clips 201 to 214 can be prevented from being easily released.

In the clips 201 to 214 according to these embodiments, in a case where the piled-layer body is fastened again after each of the clips 201 to 214 which keeps holding the sheaf of sheets S has been released in a coping operation or the like, the end of the piled-layer body is hooked on the free end longer from the bent position and each of the clips 201 to 214 is twirled on a fulcrum of the free end shorter from the bent position, so that the piled-layer body can be easily inserted into each of the clips 201 to 214 and the sheaf of sheets S can be kept fastened again.

Further, in a case where the piled-layer body is fastened again after each of the clips 201 to 214 which keeps holding the piled-layer body has been released, the piled-layer body can be inserted in between the free ends of the clip along a guiding portion.

Further, in a case where the elastic limit near the bent middle of each of the clips 201 to 214 is designed to be lower than the elastic limit on the side of the free ends, the force of holding the fastened piled-layer body becomes larger. Therefore, even though the released clip is attached again, the force of holding the sheaf of sheets S by the clip can be retained.

Further, in a case where a standard fastening operation is made at a room temperature, the sheets S can be held. Then, when heated up to a predetermined temperature, each of the clips 201 to 214 can be released. Accordingly, a certain holding force can be maintained.

Embodiment 6

A sixth embodiment of the present invention will be hereinafter described with reference to drawings.

A sheet-clipping apparatus according to the present invention, as shown in FIG. 29(a), comprises a clipping apparatus body 301, and a cartridge 302 used as a clip holder which can be removed from the clipping apparatus body 301.

(i) CARTRIDGE 302

As shown in FIG. 31(a), the cartridge 302 comprises a case 303, and a lid body 304 for opening or closing an opening (not shown) of the case 303. The lid body 304 is attached to the case 303 so that it can be pivoted on a supporting shaft 305. When the lid body 304 is opened, a clip-connected body 306 shown in FIG. 31(b) can be set inside of the case 303. In the clip-connected body 306, a plurality of narrow and plate-like metallic clips 307 are continuously adhered on one surface of a piece of tape 308 and then the tape on which the clips have been adhered are wound. A circular-arc curved portion 307a is formed at one end of the clip 307.

When the case 303 shown in FIG. 31(a) is seen from the direction of an arrow A, a slit-like opening 303a shown in FIG. 31(c) through which the tape is pulled out is formed in the case 303. An end 306a of the clip-connected body 306 in the case 303 is pulled out through the slit-like tape-pulling opening 303a. A wide opening 303b through which the curved portion 307a of the clip 307 is pulled out is formed in the tape-pulling opening 303a.

(ii) CLIPPING APPARATUS BODY 301

As shown in FIGS. 29(a) and 29(b), a clipping apparatus body 301 comprises a main body case 310, a clamping mechanism 311 attached to the main body case 310, and a driving mechanism 312 of the clamping mechanism 311. In FIG. 29 (b), reference character 310a designates an upper-front wall of the main body case 310, 310b designates a side wall of the main body case 310, 310c designates a lower-back wall of the main body case 310, and 310d designates a spring hook formed in the lower-back wall 310c.

[CLAMPING MECHANISM 311]

A clamping mechanism 311 comprises a means 313 for adjusting to any sheet-thickness, and a clamping means 314.

(SHEET-THICKNESS ADJUSTING MEANS 313)

The sheet-thickness adjusting means 313 comprises a first pivotal drive member 315 which is seen to be reverse U-shape from the direction of an arrow A1, a second pivotal drive member 316 disposed inside of the pivotal drive member 315 which is also seen to be a reverse U-shape from the direction of the arrow A1, and a supporting shaft 317 for supporting the parts on the sides spaced away from upper walls 315a, 316a of the pivotal drive members 315, 316 on the side wall 310b of the main body case 310. The supporting shaft 317 penetrates the pivotal drive members 315, 316, the configuration of the side of the pivotal drive member 316 is smaller than that of the pivotal drive member 315, and a shaft-attached portion 315b which does not overlap with the pivotal drive member 316 is attached to the lower side of the pivotal drive member 315.

Further, the sheet-thickness adjusting means 313 comprises a bolt 318 which penetrates the upper walls 315a, 316a of the pivotal drive members 315, 316 from the below, a washer 319 which is engaged with the circumference on the front-end side of the bolt 318, a nut 320 which is positioned above the washed 319 and is locked on the front end of the bolt 318, a coil spring 321 which is laid between the washer 319 and the upper walls 315a, a coil spring 322 which is laid between the washer 319 and the spring hook 310d, and a cam-engaging shaft 323 which is disposed in parallel to the supporting shaft 317 and is fixed on the shaft-attached portion 315b.

(CLAMPING MEANS 314)

The clamping means 314 comprises a plate-like clamping member 324 which is formed in a L-shape (a bell-crank-shape) from arm portions 324a, 324b, and a plate-like clamping member 325 which is formed in a L-shape (a bell-crank-shape) from arm portions 325a, 325b. Reference character 326 designates a circular-arc guide hole which is positioned in the bent portion of the clamping member 325.

Further, the clamping means 314 comprises a drive shaft 327 which is fixed on the clamping member 324 and is passed through the guide hole 326, and a supporting shaft 328 which supports so that the upper end (one end) of the arm portion 324a of the clamping member 325 can be pivoted on the side wall 310b of the main body case 310.

Figure 27A:
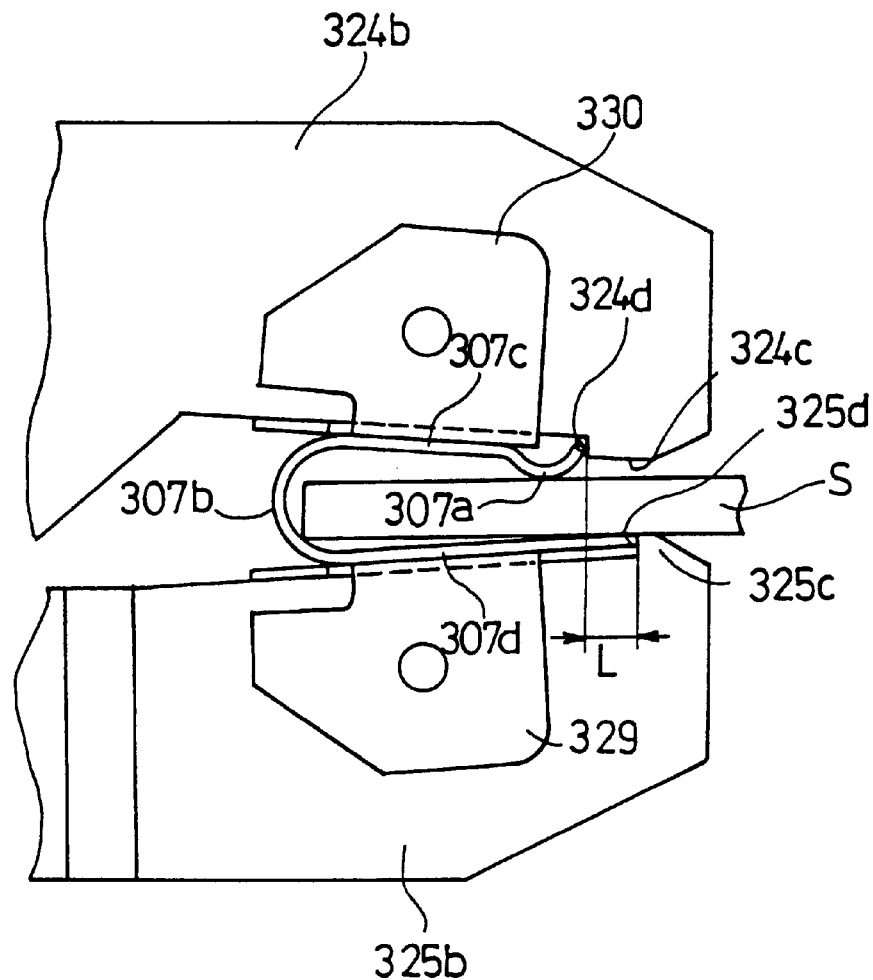
FIG. 27(*a*) is an essential-part enlarged descriptive drawing showing a clamp portion of a sheet-clipping apparatus according to the present invention.
Figure 30:
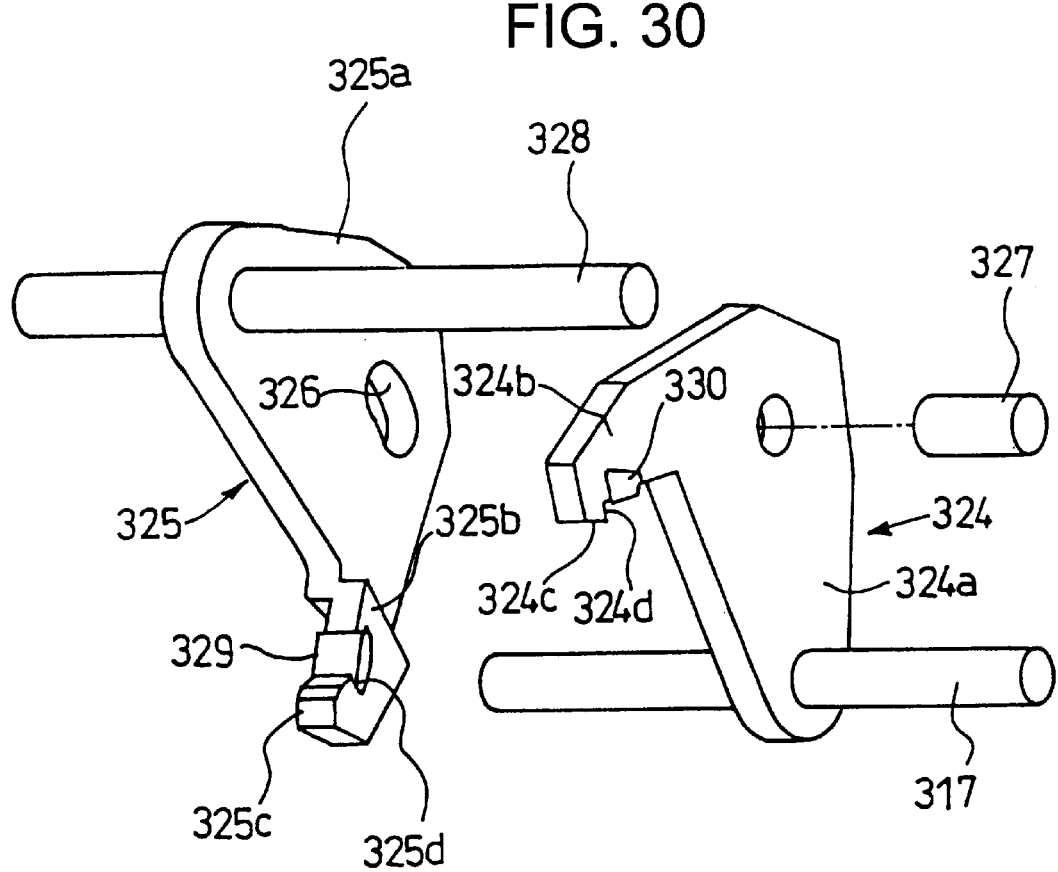
FIG. 30 is a perspective view of the clamp member shown in FIG. 28(*a*) and FIG. 28(*b*).

In addition, as shown in FIG. 30, an arm portion 325b of the clamping member 325 is bent in the direction of being perpendicular to the plate surface and the arm portion 324b of the clamping member 324. Thereby, the arm portions 324b, 325b of the clamping members 324, 325 are made clamp portions which are opposite to each other. Projecting portions 324c, 325c which project toward the directions of approaching each other are formed in the front ends of the arm portions 324b, 325b. The sides of the projecting portions 324c, 325c correspond to first and second hooking portions 324d, 325d. As shown in FIG. 27(a), the arm portions 324b, 325b are slightly shifted toward the directions in which the clip 307 is bent when being brought closer to the first and second hooking portions 324d, 325d. In brief, the hooking portions 324d, 325d are formed at intervals of L in the directions in which the clip 307 is bent. Herein, reference character 329, 330 designate pressing members which are attached to the sides on which the arm portions 324b, 325b face each other.

[DRIVING MECHANISM]

The driving mechanism 312 comprises a drive cam 331 which is in contact with the circumferential surface of a cam-engaging shaft 323 and is held so that it can be pivoted on the side wall 310b of the main body case 310, a driving motor (not shown) which is attached to the main body case 310, and a speed-reducing mechanism (not shown) which reduces the revolution of the driving motor and transmits it to the drive cam 331. Herein, the cam-engaging shaft 323 is in contact with the circumferential surface of the drive cam 331 by the pressing force of the coil spring 332.

Herein, there is provided with a clip-delivering means in which the front end of the aforementioned clip-connected body 306 is delivered by a single clip 307 toward between the front ends of the arm portions 324b, 325b before the clamping members 324, 325 are pivoted via the drive cam 331 which rotates together with the driving motor.

The driving motor of the drive cam 331 may also be used as the clip-delivering means, or another driving means except the driving motor may also be used. In a case where the driving motor is used, as shown in FIG. 29(b), the clip-connected body 306 is delivered by the driving motor between the time when the drive cam 331 starts to rotate counterclockwise by the driving motor and the time when a point P of the largest radius of the drive cam 331 becomes engaged with the cam-engaging shaft 323. Further, in a case where another driving means except the driving motor is used, it is detected mechanically or electrically that the clip-connected body 306 has been delivered by the driving means, so that the drive cam 331 may also be rotated in an operation of the driving motor.

Next, there will be explained an function of the sheet-clipping apparatus with such a construction and the sheet-holding clip which is produced by the sheet-clipping apparatus.

According to this construction, the front end of the clip-connected body 306 is delivered by a single clip 307 toward between the front ends of the arm portions 324b, 325b by the driving means before the clamping members 324, 325 are pivoted via the drive cam 331 which rotates together with the driving motor, and as shown in FIG. 2(a), the single clip 307 is brought between the arm portions 324b, 325b used as the clamp portion.

Thereafter, when the drive cam 331 starts to rotate counterclockwise in FIG. 29(b) by the driving motor and the cam-engaging shaft 323 is pressed against the pressing force of the coil spring 322 and is moved upward according to the drive cam 331, the pivotal drive member 315 is pivoted clockwise in FIG. 29(b) on the supporting shaft 317. This pivotal movement is transmitted to the pivotal drive member 316 via the coil spring 321, the washer 319, the nut 320, and the bolt 318, and then the pivotal drive member 316 is pivoted clockwise in FIG. 29(b) on the supporting shaft 317. According to this pivotal movement, the supporting shaft 317 and the clamping member 324 are pivoted counterclockwise together with the pivotal drive member 316. Then, according to this pivotal movement, the drive shaft 327 of the clamping member 324 is moved upward along the circular-arc guide hole 326 of the clamping member 325, and the clamping member 325 is pivoted counterclockwise on the supporting shaft 328 according to the drive shaft 327.

Figure 27B:
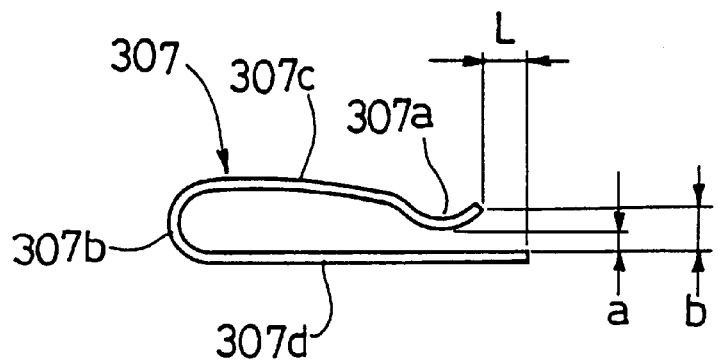
Figure 28A:
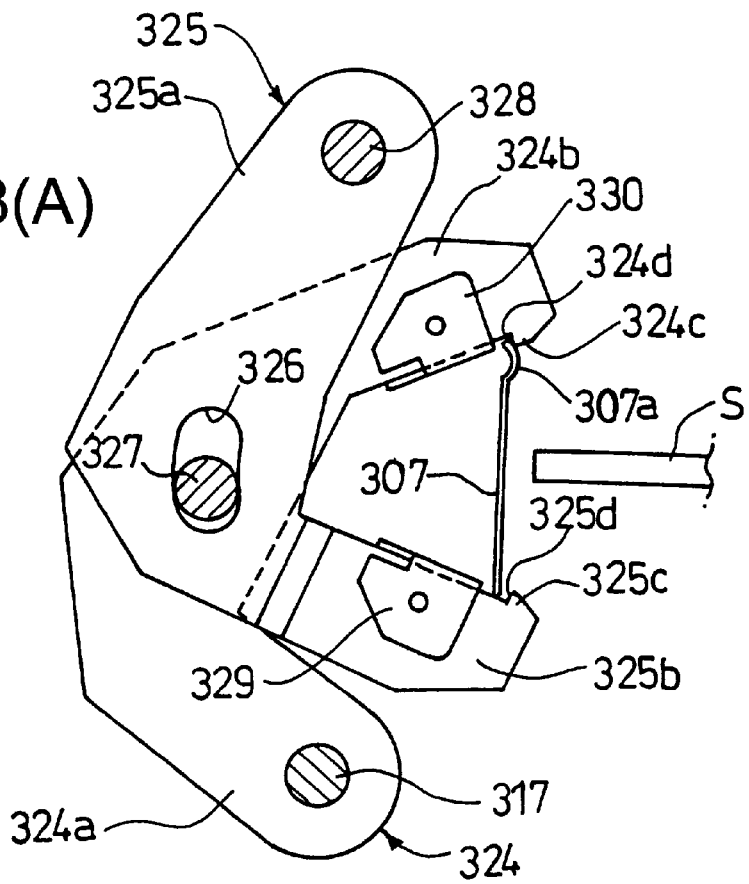
FIG. 28(*a*) is a descriptive drawing showing the function of the clamp member of the sheet-clipping apparatus.
Figure 28B:
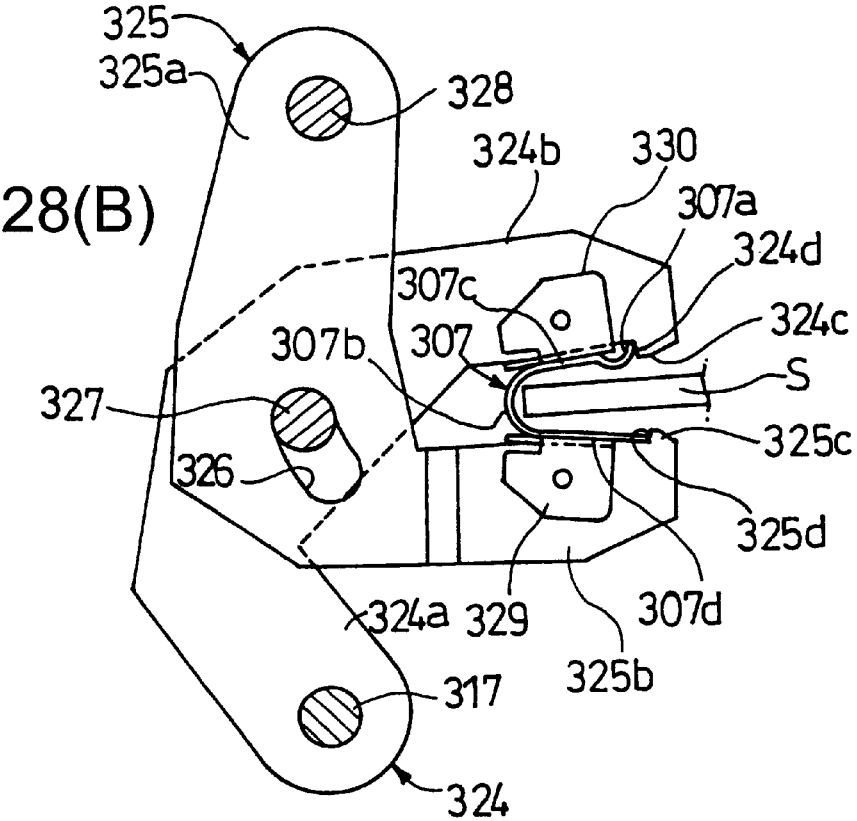

According to the pivotal movements of these clamping members 324, 325, the interval between the arm portions 324b, 325b of the clamping members 324, 325 is gradually made shorter, and as shown in FIG. 28(b), both ends (the upper and lower ends) of the clip 307 are hooked on the first and second hooking portions 324d, 325d of the arm portions 324b, 325b. In addition, both ends of the clip 307 are turned toward the piled sheets S and as shown in FIG. 27(b), a bent portion 307b of the clip 307 is formed in substantially the middle part, so that a sheet-holding clip including nipping pieces 307c, 307d which are opposite to each other can be formed.

Accordingly, in the midst of the operation in which the clip 307 is bent, the edge of the piled sheets S in which a plurality of sheets are piled is inserted into between the nipping pieces 307c, 307d of the clip 307 to be bent, as shown in FIG. 27(a), so that the piled sheets S can be held between the nipping pieces 307c, 307d of the clip 307.

Herein, because of the interval L between the first and second hooking portions 324d, 325d of the clamping members 324, 325, the nipping piece 307d of the bent clip is shorter by L than the nipping piece 307c. Besides, the curved portion 307a which is curved toward the nipping piece 307d is formed at the end of the nipping piece 307c.

As a result, the curved portion 307a functions as a sheet-guiding portion so that the interval between the curved portion 307a and the nipping piece 307d becomes wider toward the front end of the curved portion 307a. In short, because of the curved portion 307a, the interval $\underline{b}$ between the front end of the curved portion 307a and the nipping piece 307d becomes larger than the interval $\underline{a}$ between the middle of the curved portion 307a and the nipping piece 307d.

Therefore, in a case where the sheet-holding clip which is formed by bending the clip 307 is reused, the piled sheets S is pressed in from between the front end of the curved portion 307a and the nipping piece 307d toward the bent portion 307b against the force of the spring of the nipping pieces 307c, 307d in a state where the edge of the piled sheets S which is thicker than the interval $\underline{b}$ and is thinner than the interval $\underline{a}$ is applied onto the nipping piece 307d, so that the piled sheets S can be easily inserted and held between the nipping pieces 307c, 307 d.

What is claimed is:

1. A clip-connected unit comprising a plurality of long-and-narrow rectangular plate-like clips arranged in parallel, said plurality of long-and-narrow rectangular plate-like clips being connected by a connecting member, wherein said clip-connected unit is wound into a roll so that said connecting member is positioned outside of the roll, and said clips are spaced from each other, and further force required to shear said connecting member is set to be smaller than durability of said connecting member against a pulling force in a longitudinal direction of said connecting member.

2. A clip-connected unit according to claim 1, wherein said connecting member is made of film.

3. A clip-connected unit according to claim 1, wherein said connecting member is adhered to both ends in a longitudinal direction of the clip.

4. A clip-connected unit according to claim 1, wherein said connecting member is so slightly adhesive as to be easily peeled from said clips after said clips have been attached to sheets.

5. A clip-connected unit according to claim 1, wherein the clip is asymmetric with respect to a symmetric axis that is a center line along which the clip is bent.

6. A clip-connected unit according to claim 5, wherein at least one end in a longitudinal direction of the clip is bent in a direction opposite to a direction in which the clip is bent when clipping a bundle of sheets.

7. A clip-connected unit according to claim 6, wherein a frictional resistance treatment for enlarging frictional resistance is given to surfaces of the clip which are brought into contact with a bundle of sheets when clipping the sheets.

8. A clip-connected unit according to claim 5, wherein a frictional resistance treatment for enlarging frictional resistance is given to surfaces of the clip which are brought into contact with a bundle of sheets when clipping the sheets.

9. A clip-connected unit according to claim 8, wherein an elastic limit of a bent portion of the clip is set to be lower than an elastic limit of both ends of the clip.

10. A clip-connected unit according to claim 5, wherein an elastic limit of a bent portion of the clip is set to be lower than an elastic limit of both ends of the clip.

11. A clip-connected unit according to claim 1, wherein at least one end in a longitudinal direction of the clip is bent in a direction opposite to a direction in which the clip is bent when clipping a bundle of sheets.

12. A clip-connected unit according to claim 1, wherein a frictional resistance treatment for enlarging frictional resistance is given to surfaces of the clip which are brought into contact with a bundle of sheets when clipping the sheets.

13. A clip-connected unit according to claim 1, wherein an elastic limit of a bent portion of the clip is set to be lower than an elastic limit of both ends of the clip.

14. A clip-connected unit according to any one of claim 12, wherein said frictional resistance treatment is performed by rough treatment to surfaces of the clip.

15. A clip-connected unit according to any one of claim 12, wherein said frictional resistance treatment is performed by resinous coating treatment.

16. A clip-connected unit according to any one of claim 12, wherein said frictional resistance treatment is performed to have a claw which is hooked on the sheets.

17. A clip-connected unit according to claim 1, wherein:

said clip is asymmetric with respect to a symmetric axis that is a center line along which the clip is bent;

at least one end in a longitudinal direction of the clip is bent in a direction opposite to a direction in which the clip is bent when clipping a bundle of sheets;

a frictional resistance treatment for enlarging frictional resistance is given to surfaces of the clip which are brought into contact with the sheets when clipping the sheets; and an elastic limit of a bent portion of the clip is set to be lower than an elastic limit of both ends of the clip.

18. A clip-connected unit according to claim 1, wherein said connecting member is made of solid resin.

19. A clip-connected unit according to claim 1, wherein said connecting member is adhered to a middle part in the longitudinal direction of the clip.

20. A clip-connected unit according to claim 1, wherein said connecting member is adhered to a whole part of the clip.

* * * * *